US007912859B2

(12) United States Patent
Takashima

(10) Patent No.: US 7,912,859 B2
(45) Date of Patent: Mar. 22, 2011

(54) INFORMATION PROCESSING APPARATUS, SYSTEM, AND METHOD FOR MANAGING DOCUMENTS USED IN AN ORGANIZATION

(75) Inventor: Taro Takashima, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 387 days.

(21) Appl. No.: 12/112,211

(22) Filed: Apr. 30, 2008

(65) Prior Publication Data

US 2009/0327293 A1    Dec. 31, 2009

(30) Foreign Application Priority Data

Oct. 2, 2007    (JP) .................................. 2007-258858

(51) Int. Cl.
*G06F 17/30* (2006.01)
*G06F 7/00* (2006.01)

(52) U.S. Cl. ...................................................... 707/783
(58) Field of Classification Search ........................ None
See application file for complete search history.

(56) References Cited

U.S. PATENT DOCUMENTS

| 5,671,428 | A | 9/1997 | Muranaga et al. |
| 5,801,648 | A | 9/1998 | Satoh et al. |
| 5,806,078 | A | 9/1998 | Hug et al. |
| 5,897,643 | A | 4/1999 | Matsumoto |
| 5,940,617 | A | 8/1999 | Tamura |
| 5,940,830 | A | 8/1999 | Ochitani |
| 5,983,241 | A | 11/1999 | Hoshino |
| 6,094,654 | A | 7/2000 | Van Huben et al. |
| 6,289,460 | B1 | 9/2001 | Hajmiragha |
| 6,615,253 | B1 | 9/2003 | Bowman-Amuah |
| 6,662,230 | B1 | 12/2003 | Eichstaedt et al. |
| 7,051,275 | B2 | 5/2006 | Gupta et al. |
| 7,086,003 | B2 | 8/2006 | Demsky et al. |
| 2002/0035525 | A1 | 3/2002 | Yokota et al. |
| 2002/0065812 | A1 | 5/2002 | Keith, Jr. |

(Continued)

FOREIGN PATENT DOCUMENTS

CN        1577324        2/2005

(Continued)

OTHER PUBLICATIONS

Mohamed Tedjini et al, "A Query Service for a Software Engineering Database System", ACM 1990, 11 pages.*

(Continued)

*Primary Examiner* — Uyen T. Le
(74) *Attorney, Agent, or Firm* — Gauthier & Connors LLP

(57) ABSTRACT

An information processing apparatus includes a document information storage unit that stores a derivation relationship designating a first document as a parent and a second document generated after an operation as a child, and an operator that performed the operation; an organization information storage unit that stores a structure of an organization hierarchy and members belonging to each of organizations; and a document output permission/prohibition determination unit that, upon receiving a document output request, determines whether or not to permit output of the requested document, by checking an operator of the requested document or an operator of a document corresponding to an ancestor of the requested document in a tree structure of the derivation relationships against members belonging to an organization including a requesting person as a member or an organization being located at a higher level than the organization including the requesting person in the organization hierarchy.

15 Claims, 10 Drawing Sheets

U.S. PATENT DOCUMENTS

| | | |
|---|---|---|
| 2002/0091651 A1 | 7/2002 | Petrogiannis et al. |
| 2002/0120506 A1 | 8/2002 | Hagen |
| 2002/0154010 A1 | 10/2002 | Tu et al. |
| 2002/0184366 A1 | 12/2002 | Kimoto et al. |
| 2003/0154071 A1 | 8/2003 | Shreve |
| 2003/0159035 A1 | 8/2003 | Orthlieb et al. |
| 2003/0182262 A1 | 9/2003 | Yamamoto et al. |
| 2004/0117363 A1 | 6/2004 | Ohno |
| 2004/0205653 A1 | 10/2004 | Hadfield et al. |
| 2004/0264811 A1 | 12/2004 | Yano et al. |
| 2005/0004885 A1 | 1/2005 | Pandian et al. |
| 2005/0021980 A1 | 1/2005 | Kanai |
| 2005/0071755 A1 | 3/2005 | Harrington et al. |
| 2005/0182785 A1 | 8/2005 | Oswalt |
| 2006/0010097 A1 | 1/2006 | Hashimoto |
| 2006/0047922 A1 | 3/2006 | Johnson et al. |
| 2006/0050648 A1 | 3/2006 | Eydelman |
| 2006/0112139 A1 | 5/2006 | Maple et al. |
| 2006/0122985 A1 | 6/2006 | Yamamoto et al. |
| 2006/0136513 A1 | 6/2006 | Ngo et al. |
| 2006/0161516 A1 | 7/2006 | Clarke et al. |
| 2006/0294152 A1 | 12/2006 | Kawabe et al. |
| 2007/0011211 A1 | 1/2007 | Reeves et al. |
| 2007/0112742 A1 | 5/2007 | Dumais et al. |
| 2007/0162441 A1 | 7/2007 | Idicula et al. |
| 2007/0299969 A1 | 12/2007 | Kunitake et al. |
| 2008/0115055 A1 | 5/2008 | Sadovsky et al. |
| 2009/0024647 A1* | 1/2009 | Hein .......................... 707/102 |
| 2009/0083831 A1 | 3/2009 | Kanai |
| 2009/0228969 A1* | 9/2009 | Garg et al. ...................... 726/10 |

FOREIGN PATENT DOCUMENTS

| | | |
|---|---|---|
| JP | 62241061 | 10/1987 |
| JP | 6077994 | 3/1994 |
| JP | 7056794 | 3/1995 |
| JP | 8292961 | 11/1996 |
| JP | 9223056 | 8/1997 |
| JP | 11053243 | 2/1999 |
| JP | 11327980 | 11/1999 |
| JP | 2000020377 | 1/2000 |
| JP | 2000347943 | 12/2000 |
| JP | 2001350667 | 12/2001 |
| JP | 2002014978 | 1/2002 |
| JP | 2002016788 | 1/2002 |
| JP | 3349978 | 9/2002 |
| JP | 2002328865 | 11/2002 |
| JP | 2003058395 | 2/2003 |
| JP | 2003303122 | 10/2003 |
| JP | 2004110692 | 4/2004 |
| JP | 2005135211 | 5/2005 |
| JP | 2005518602 | 6/2005 |
| JP | 2005338935 | 12/2005 |
| JP | 2006024059 | 1/2006 |
| JP | 2006053686 | 2/2006 |
| JP | 2007004649 | 1/2007 |
| KR | 1020060049337 | 5/2006 |
| KR | 1020060092859 | 8/2006 |
| WO | 03073272 | 9/2003 |

OTHER PUBLICATIONS

US Office Action issued in connection with U.S. Appl. No. 11/753,690, mailed on Nov. 5, 2009.
US Office Action issued in connection with U.S. Appl. No. 11/282,022, mailed on Dec. 11, 2009.
Korean Office Action with partial English translation, mailed on Dec. 2, 2008, corresponding to Korean Patent Application No. 10-2007-0058939.
Office Action for U.S. Appl. No. 11/753,690, mailed on May 28, 2009.
Office Action for U.S. Appl. No. 11/671,519, mailed on Jun. 2, 2009.
Stoica et al., "Chord: A Scalable Peer-to-peer Lookup Service for Internet Applications"; MIT Laboratory for Computer Science; Aug. 27-31, 2001, San Diego, CA; pp. 1-12.
Office Action from the United States Patent and Trademark Office mailed Jan. 9, 2008 for U.S. Appl. No. 11/282,022; Shigehisa Kawabe.
U.S. Appl. No. 11/671,519, filed Feb. 6, 2007; Kunitake et al., "Document Management Server, Method, Storage Medium and Computer Data Signal, and System for Managing Document Use".
U.S. Appl. No. 11/748,626, filed May 15, 2007; Kawabe et al., "Document Providing System and Computer-Readable Storage Medium".
U.S. Appl. No. 11/282,022, filed Nov. 17, 2005; Kawabe et al., "Document Management Server, Document Management System, Computer Readable Recording Medium, Document Management Method, Client of Document Management System, and Node".
U.S. Appl. No. 11/839,715, filed Aug. 16, 2007; Masao Nukaga; "Information-Processing Apparatus, Information-Processing System, Information-Processing Method, Computer-Readable Medium, and Computer Data Signal".
U.S. Appl. No. 11/753,690, filed May 25, 2007; Akira Suzuki; "Information Processing Apparatus, Information Processing System, and Computer Readable Storage Medium".
U.S. Appl. No. 11/939,708, filed Nov. 14, 2007; Katsunori Houchi; "Information Processign Apparatus, Information Processing System, Information Processing Method, and Computer Readable Storage Medium".
U.S. Appl. No. 11/942,943, filed Nov. 20, 2007; Setsu Kunitake; "Information Processing Apparatus, Information Processing System, and Storage Medium".
U.S. Appl. No. 12/055,530, Taro Yoshihama, filed Mar. 26, 2008; "Document Management Apparatus, Document Management System and Method, and Computer-Readable Medium".
US Office Action issued in U.S. Appl. No. 11/942,943 mailed on Jan. 19, 2010.
Office Action issued on Feb. 21, 2009 from the Chinese Patent Office for corresponding Chinese Patent Application No. 200710005902.4, with English translation.
US Office Action issued in U.S. Appl. No. 11/942,943 mailed on Jun. 7, 2010.
US Office Action issued in U.S. Appl. No. 11/748,626 mailed on Jun. 10, 2010.
US Office Action issued in U.S. Appl. No. 11/282,022 mailed on Jul. 6, 2010.
US Office Action issued in U.S. Appl. No. 11/939,708 mailed on Jul. 27, 2010.
U.S. Office Action issued in U.S. Appl. No. 11/839,715 mailed on Oct. 7, 2010.
Office Action issued in connection with U.S. Appl. No. 11/748,626 mailed Nov. 26, 2010.
English translation of Office Action issued in connection with Japanese Patent Application No. 2005-185934 mailed on Nov. 16, 2010.
Office Action issued in connection with U.S. Appl. No. 11/753,690 mailed on Jan. 3, 2011.

* cited by examiner

| MANAGEMENT ID | PARENT ID | NODE ADDRESS | OPERATION TYPE | OPERATOR | OPERATION TIME AND DATE |
|---|---|---|---|---|---|
| Doc1 | NULL | /1 | REGISTRATION | user1 | 2007-9-01T15:00 |
| Doc2 | Doc1 | /1/1 | VIEWING | user2 | 2007-9-01T17:15 |
| Doc3 | Doc2 | /1/1/1 | UPDATE | user2 | 2007-9-02T14:20 |
| Doc4 | Doc3 | /1/1/1/1 | UPDATE | user3 | 2007-9-02T18:42 |
| Doc5 | Doc3 | /1/1/1/2 | UPDATE | user4 | 2007-9-03T12:04 |
| Doc6 | Doc4 | /1/1/1/1/1 | ACQUISITION | user5 | 2007-9-03T13:30 |
| Doc7 | Doc6 | /1/1/1/1/1/1 | UPDATE | user5 | 2007-9-03T15:08 |
| Doc8 | Doc4 | /1/1/1/1/2 | ACQUISITION | user6 | 2007-9-03T17:30 |
| Doc9 | Doc8 | /1/1/1/1/2/1 | UPDATE | user6 | 2007-9-04T08:00 |
| Doc10 | Doc4 | /1/1/1/1/3 | UPDATE | user4 | 2007-9-04T11:20 |
| Doc11 | Doc5 | /1/1/1/2/1 | UPDATE | user7 | 2007-9-04T15:40 |
| Doc12 | Doc5 | /1/1/1/2/2 | UPDATE | user8 | 2007-9-04T17:15 |
| Doc13 | Doc1 | /1/2 | UPDATE | user3 | 2007-9-05T14:20 |
| ... | | | | | ... |

FIG. 5

| NAME OF ORGANIZATION | HIGHER ORGANIZATION |
|---|---|
| ENTIRE COMPANY | NULL |
| ... | ... |
| 1G | X SECTION |
| 1T | 1G |
| 2T | 1G |
| ... | ... |

| USER ID | BELONGING ORGANIZATION | MANAGERIAL POSITION |
| --- | --- | --- |
| user0 | ENTIRE COMPANY | ○ |
| ... | ... | ... |
| user1 | X SECTION | ○ |
| user2 | 1G | ○ |
| user3 | 1T | ○ |
| user5 | 1T | × |
| user6 | 1T | × |
| ... | ... | ... |
| user4 | 2T | ○ |
| user7 | 2T | × |
| ... | ... | ... |
| user8 | 1T, 2T | × |
| ... | ... | ... |

FIG. 9

INFORMATION PROCESSING APPARATUS, SYSTEM, AND METHOD FOR MANAGING DOCUMENTS USED IN AN ORGANIZATION

CROSS-REFERENCE TO RELATED APPLICATIONS

This application is based on and claims priority under 35 USC 119 from Japanese Patent Application No. 2007-258858, filed on Oct. 2, 2007.

BACKGROUND

1. Technical Field

The present invention relates to an information processing apparatus, an information processing system, a storage medium, an information processing method, and a data signal.

2. Related Art

In a system in which electronic documents are registered in a server, user authorization to be provided to a user concerning an electronic document is generally managed by information which is set and registered for each electronic document (file) and which represents authorization of each user or each group; i.e. access right to the corresponding document, such as permission or prohibition of viewing and writing of the document. A system which manages use of electronic documents, when receiving a request for an operation with respect to a certain document from a user, determines, based on the access right information which is set and registered concerning the certain document, whether or not the requested operation falls within the authorization of the user, to thereby determine whether or not the user is authorized to perform the requested operation.

For a case where an electronic document use management system in which access right information is set and registered for each document is used to manage electronic documents for use in a group formed of multiple organizations constituting a hierarchical structure, such as a company, there has been proposed a technology for setting access right for each document by using information concerning the organizations in the group, such as the hierarchical structure of the organizations and business sharing among the organizations.

SUMMARY

An aspect of the invention provides an information processing apparatus including: a document information storage unit that stores a derivation relationship in which a first document is a parent and a second document generated as a result of an operation performed with respect to the first document is a child, the document information storage unit storing information representing an operator that performed the operation with respect to the first document in association with the second document; an organization information storage unit that stores information representing a structure of an organization hierarchy formed of multiple organizations and information representing members belonging to each of the organizations; and a document output permission/prohibition determination unit that, upon receiving a document output request in which a requested document and a requesting person are specified, determines whether or not to permit output of the requested document to the requesting person, by checking information representing an operator associated with the requested document or information representing an operator associated with a document corresponding to an ancestor of the requested document in a tree structure of the derivation relationships stored in the document information storage unit against information representing members belonging to an organization that includes the requesting person as a member or an organization that is located at a higher level than the organization including the requesting person in the organization hierarchy in the information stored in the organization information storage unit.

BRIEF DESCRIPTION OF THE DRAWINGS

An exemplary embodiment of the present invention will be described in detail by reference to the following figures, wherein:

FIG. 5 is a view showing example data content registered in a derivation relationship DB;

FIG. 9 is a view showing example data content registered in an organization information DB;

DETAILED DESCRIPTION

An exemplary embodiment of the present invention will be described in detail with reference to the accompanying drawings.

Figure 1:
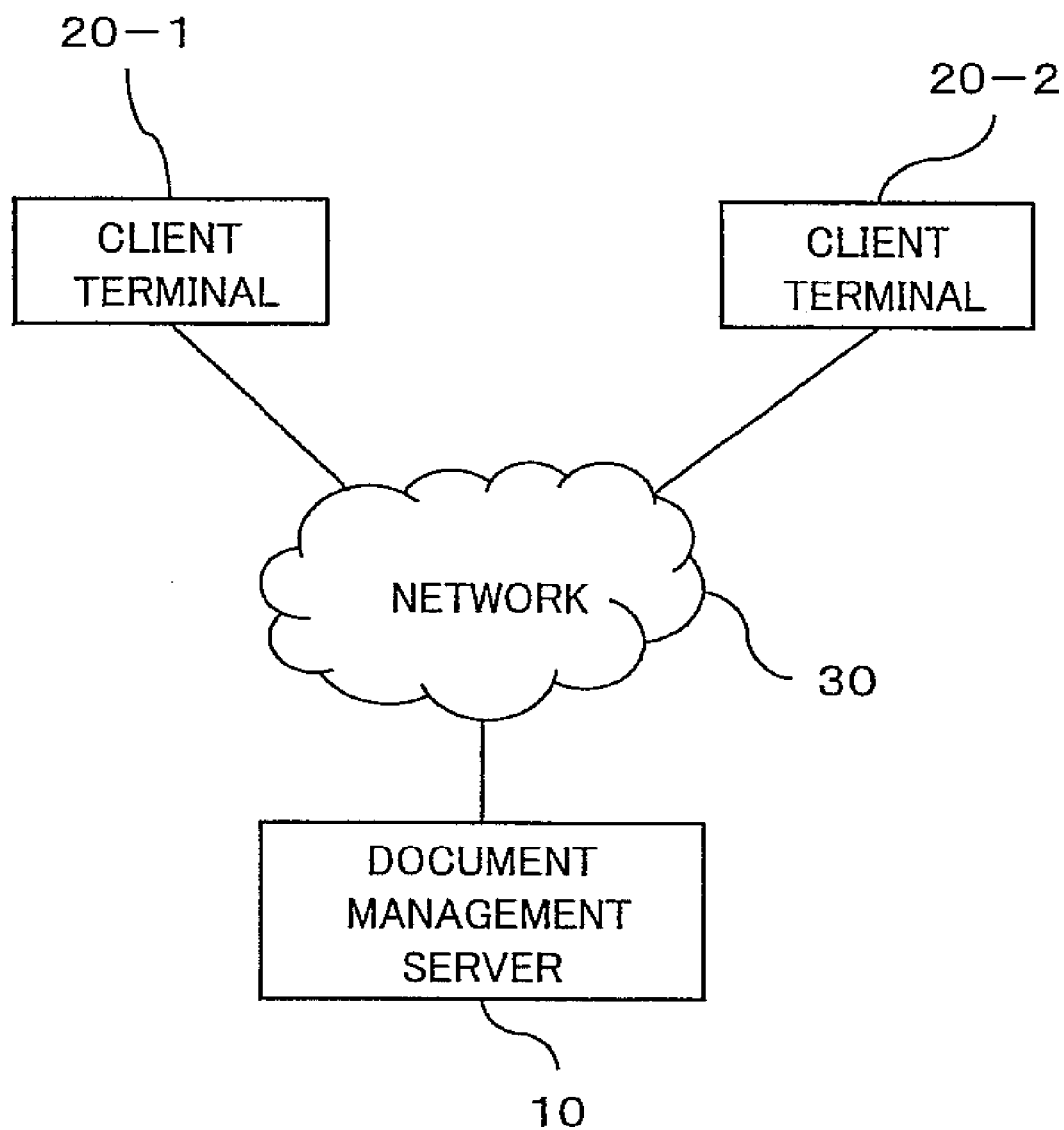
FIG. 1 is a block diagram schematically showing an example structure of a document usage management system.

FIG. 1 is a block diagram schematically showing a structure of a document usage management system. This system is formed of a document management server 10 and client terminals 20-1, 20-2, . . . (hereinafter collectively referred to as a client terminal 20) that are connected to each other via a network 30 such as the Internet, a Local Area Network, or the like.

Figure 2:
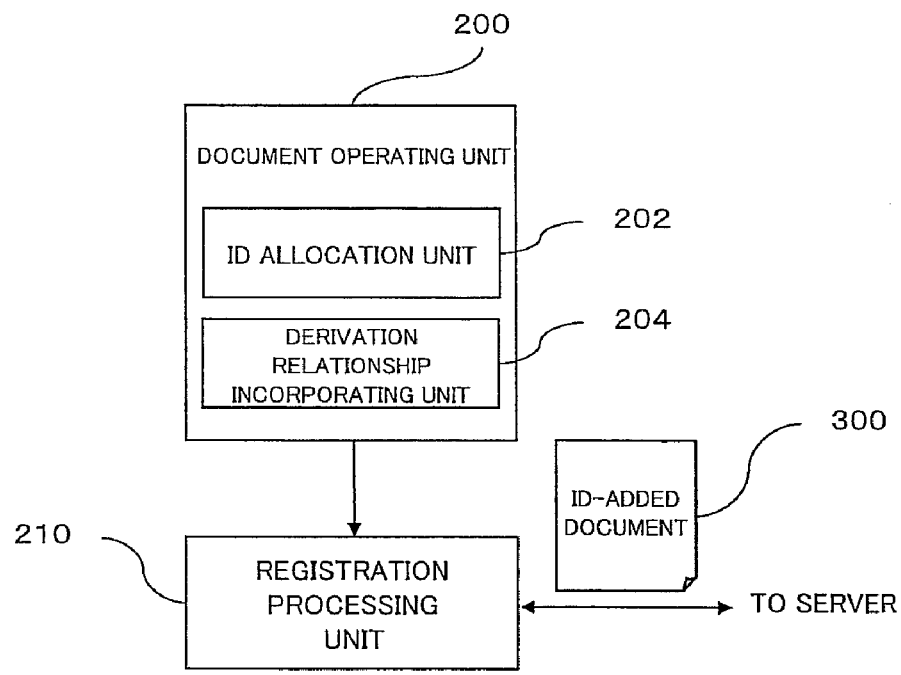
FIG. 2 is a block diagram showing an example internal structure of a client terminal.

The client terminal 20 will be described with reference to FIG. 2. The client terminal 20 is a terminal used by a user for performing an operation with respect to a document, and may be a personal computer, a digital multifunction device, or the like. As shown in FIG. 2, the client terminal 20 includes a document operating unit 200 and a registration processing unit 210.

The document operating unit 200 is used for performing an operation with respect to a document, including display (i.e. "viewing" by a user), editing, printing, and output of a document, reading and copying of a paper document, and the like. Although only a single document operating unit 200 is shown in FIG. 2, the individual operations may be performed by different operating units (e.g. different applications such as an editing application and a reading control application). If the document operating unit 200 is software used for creating and editing an electronic document, such as a word processing program, for example, the document operating unit 200, in accordance with a user's instruction, displays an electronic document or edits the electronic document. The document operating unit 200, when performing an operation with respect to a document, outputs an ID-added document 300 that represents a result of the operation.

Figure 3:
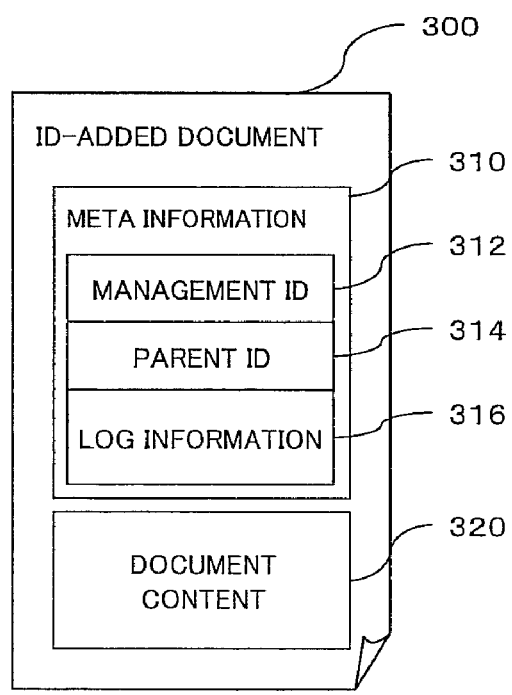
FIG. 3 is a view schematically showing an example data structure of an ID-added document.

As shown in FIG. 3, the ID-added document 300 is an electronic document including meta information 310 and document content 320. The document content 320 corresponds to content data of a document that are generated as a result of the operation performed by the document operating unit 200. If the document operating unit 200 is software that creates and edits an electronic document, the document content 320 is a document file generated as a result of editing performed by the software. Alternatively, if the document operating unit 200 is a device that prints an electronic document, the document content 320 may be content data of an electronic document to be printed. Further, if the document operating unit 200 is a device that scans a paper document or a device that copies a paper document, the document content 320 may be image data acquired by reading the paper document.

The meta information 310 is information used for document management, and includes a management ID 312, a parent ID 314, and log information 316.

The management ID 312 is unique identification information of an ID-added document 300 itself. The parent ID 314 is a management ID of a parent ID-added document of that ID-added document 300. Specifically, in this exemplary embodiment, a certain ID-added document and a new ID-added document acquired by performing an operation with respect to the certain ID-added document are treated as being in a parent-child relationship. More specifically, when a second ID-added document is acquired by performing an operation with respect to a first ID-added document, the first ID-added document is a parent of the second ID-added document, and the second ID-added document is a child of the first ID-added document. For example, when the document-operating unit 200 performs an operation with respect to an ID-added document having a management ID "A," and a new ID-added document having a management ID "B" is acquired as a result of the operation, the management ID 312 in the meta information 310 of the latter document is "B" and the parent ID 314 of this document is "A." Such a parent-child relationship will be referred to as a "derivation relationship (of management IDs)."

Here, in a case wherein an operation of initially registering an electronic document which has not been registered in the present system is performed and also in a case wherein an operation of scanning or copying an unregistered paper document is performed (in the latter case, an ID-added document including an image acquired by reading the paper document as its document content is generated and registered in the present system), the ID-added document 300 which is generated would have no parent ID 314 (that is, no parent exists).

The log information 316 refers to information of various log items concerning the operation performed when the ID-added document is generated. The log items may include the time and date when the operation is performed, the type of the operation, a user (operator) who instructed the operation, and the like, and are not limited to these examples. The operation types include, for example, registration (i.e. registration of a new document in the present system), viewing, editing, updating (registration of an updated version), printing, scanning, copy of a paper document, and the like. For example, when a user uses the document operating unit 200 to edit a first ID-added document and then instructs completion of editing, the log information 316 of the resulting second ID-added document includes the time and date of editing completion, identification information of a user who instructed the editing, and the type of operation "editing."

Here, the operation types included in the log information 316 are operation types corresponding to the classification intended for recording logs and need not correspond to the operation types actually executed by the document-operating unit 200. In this regard, multiple operation types executed by the document operating unit 200 may be associated with a single operation type intended for log recording. For example, in both the case where an ID-added electronic document is edited on a document editing application and "registration as an updated version" is instructed on an operation menu and the case where a paper document with a management ID is read and "registration of a read document as an approved version" is instructed on the operation menu of the reading control application, the same value of the operation type "updating" is to be included in the log information 316.

A specific example of the meta information 310 generated by the document operating unit 200 is as follows.

EXAMPLE 1

<metadata sid="Doc1" date="2006-10-01T10:00" method="register" filename="aaa.doc" user="user1"/>

Here, the sid attribute corresponds to a management ID, the date attribute corresponds to operation time and date, and the method attribute corresponds to an operation type. Further, the filename attribute corresponds to a file name of the ID-added document, and the user attribute corresponds to user identification information of a user who instructed the operation. The method attribute value "register" in Example 1 represents a name of an operation type representing a registration operation of a new document (which has not been registered in the document management server 10). Because the target operation is registration of a new document, the pid attribute representing a parent ID is omitted. Here, an attribute indicating that no parent ID exists, such as pid="null," may be explicitly included rather than the pid attribute being omitted.

Here, the document operating unit 200 may encrypt a document which is obtained by an operation, in such a manner that a document operating unit 200 which conforms to the present system would be able to decrypt the encrypted document. In this case, the document content 320 of the ID-added document 300 output from the document operating unit 200, which has been encrypted, can be decrypted only by the document operating unit 200 conforming to the present system. Accordingly, when such an ID-added document is operated, in which case the document operating unit 200 is used, the operation is detected by the document operating unit 200 and the content of the operation is reported from the document operating unit 200 to the document management server 10. Further, in addition to the document content 320, the meta information 310 (or a portion of the meta information) may also be encrypted.

Referring back to FIG. 2, the document operating unit 200 includes an ID allocation unit 202 and a derivation relationship incorporating unit 204 so as to generate the ID-added document 300 described above as a result of an operation. The ID allocation unit 202 assigns a unique management ID to an ID-added document generated as a result of an operation. The management ID needs to be identification information that is unique at least within the present system. For example, it is possible to acquire a hash value of an ID-added document 300 (excluding the management ID 312) to be generated as a result of an operation and use the hash value as a management ID of the ID-added document 300. When a collision-resistant cryptographic hash function, such as SHA-256 (that is, a cryptographic hash function having a hash value of 256 bits defined in FIPS (Federal Information Processing Standards) 180-2 by the NIST (National Institute of Standards and Technology)), is used as the hash function, a management ID having practically sufficient uniqueness can be generated. As a matter of course, a method of generating a management ID that is unique within the system by each client terminal 20 is not limited to the above example. When the management ID includes identification information that is specific to each client terminal 20, the management ID that is unique within the system can be generated in each client terminal 20.

The derivation relationship incorporating unit 204 generates meta information 310 including a new management ID 312 assigned to a document acquired by a result of an operation by the ID allocation unit 202, a parent ID 314 that is a management ID of a parent document with respect to which the operation has been performed (in the case of initial registration, no such parent ID exists), and log information 316 concerning the operation. Here, the derivation relationship incorporating unit 204 holds information concerning a correspondence relationship indicating a correspondence between the individual operation types executed by the document operating unit 200 and the individual operation types intended for log recording, and, using such information, acquires a value of the operation type to be included in the log information. The derivation relationship incorporating unit 204 then adds the meta information 310 to the document content of the operation result to thereby generate and output an ID-added document 300 acquired after the operation.

When the document operating unit 200 is application software, the ID allocation unit 202 and the derivation relationship incorporating unit 204 may be implemented as a plug-in program which is added to the software.

The registration processing unit 210 performs processing for registering the ID-added document 300 output from the document operating unit 200 to the document management server 10. Thus, each client terminal 20 registers to the document management server 10 as described above the ID-added document 300 acquired as a result of an operation performed by each client terminal 20 itself, so that the document management server 10 can recognize the derivation relationship between the respective ID-added documents 300.

The ID-added document 300 output from the document operating unit 200 as a result of an operation can be sent to others by electronically copying or by attaching the same to an electronic mail and the like, similar to cases with general document files. Here, because, in this example, software for use in transmission of an electronic mail does not comply with the present system, this transmission operation is not reflected in an ID-added document and therefore is not recorded in the document management server 10. When a user who receives an ID-added document 300 from another user uses the document-operating unit 200 of his/her own client terminal 20 to perform an operation with respect to the received ID-added document 300, a new ID-added document to which a new management ID is assigned in accordance with the operation is to be generated.

Further, when printing an electronic document, the document operating unit 200 may generate a management ID and embed the management ID in the printed electronic document. Here, embedding of the management ID can be performed, for example, by superposing a code image representing the management ID with a printed image of the electronic document. Further, when a print sheet includes an RFID (Radio Frequency Identifier) tag, the management ID may be written in the RFID tag. When such a printing operation is performed, the document operating unit 200 registers an ID-added document including meta information such as the management ID, the operation type, which is "printing" in this case, and the like, in the document management server 10. Here, when an ID-added document is printed, a new ID-added document including the management ID of the ID-added document as a parent ID 314 is generated. The new ID-added document corresponding to such a printing operation may include, as the document content 320, printing data such as page description language data and bit map image data representing a printed image or a document file which is to be printed.

Further, when a paper document having a management ID embedded therein is read by the document operating unit 200, the document operating unit 200 assigns a new management ID with respect to the reading operation, and generates an ID-added document including an image of the reading result as the document content 320 and registers the ID-added document in the document management server 10. The management ID read from the original paper document is set as a parent ID 314 of the ID-added document. At the time of copying a paper document having a management ID embedded therein, both the reading processing and the printing processing described above are to be performed.

Figure 4:
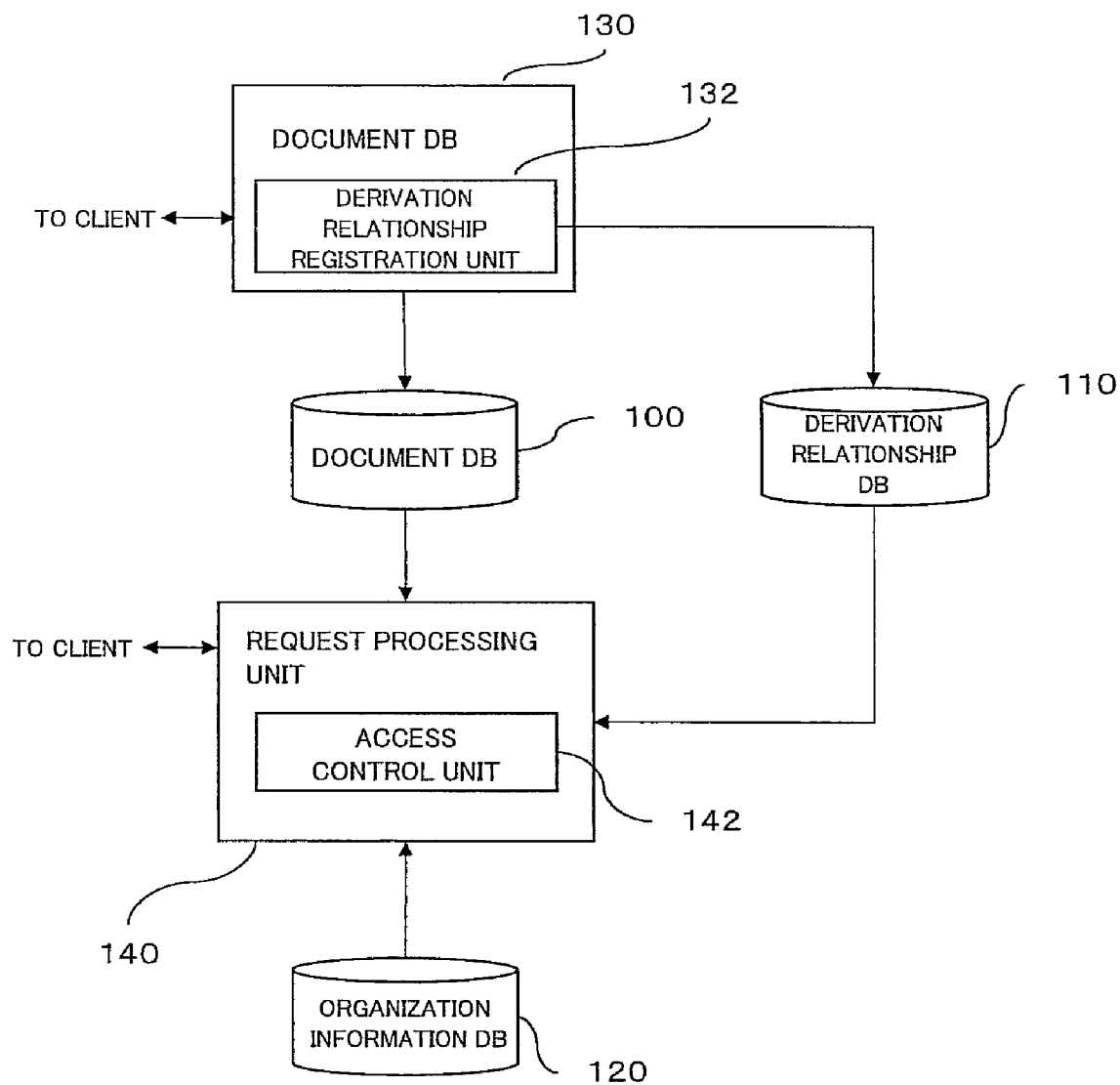
FIG. 4 is a block diagram showing an example internal structure of a document management server.

Next, the document management server 10 will be described. The document management server 10 stores ID-added documents 300 sent from multiple client terminals 20 in the system and provides various services to users in accordance with the stored information. As shown in FIG. 4, the document management server 10 includes a document DB 100, a derivation relationship DB 110, an organization information DB 120, a document registration unit 130, and a request processing unit 140.

The document DB 100 is a database that stores the document content 320 of an ID-added document 300 transmitted from the client terminal 20. Each set of document content 320 stored in the document DB 100 may be managed by reference to a unique content ID. Although a hash value obtained by a cyptographic hash function of the corresponding document content may be used as the content ID, the content ID is not limited to this example. The content ID may be assigned by the client terminal 20, in which case the content ID may be included in the meta information 310. Alternatively, in place of assigning the content ID, the document content 320 may be stored in the document DB 100 in association with a management ID of the ID-added document 300 corresponding to that document content.

The document registration unit 130 registers the document content and the meta information of an ID-added document received from the client terminal 20 in the document DB 100 and the derivation relationship DB 110, respectively. Of these registration operations, registration of the meta information is performed by the derivation relationship registration unit 132.

The derivation relationship DB 110 is a database that stores meta information mainly concerning the information of a derivation relationship in such an ID-added document 300. FIG. 5 shows example data content of the derivation relationship DB 110. The information in one row in the table shown in FIG. 5 represents a meta information record corresponding to one ID-added document 300. In this example, items including a parent ID, a node address, an operation type, an operator, and an operation time and date are registered in correspondence to the management ID of each ID-added document 300. The information items in the meta information record are not limited to those in the above example, and any items necessary for the purpose of management can be recorded, so long as the pair consisting of the management ID and the parent ID is included. Here, the operation type, the operator, and the operation time and date have been described above.

A node address indicates a position of a node corresponding to a noted management ID (a noted ID-added document) in a tree formed by derivation relationships among ID-added documents. In the description of a node address, the symbol "/" indicates a separator between hierarchical depths of the tree and a numeral indicates the order among children derived from the same parent. For example, a node "/1" indicates a root node corresponding to a document that is registered by an operation of a new document registration. Further, a node "/1/1" indicates a first child of the root node "/1," and a node "/1/2" indicates the second child of the root node "/1." Although, for the sake of simplicity, FIG. 5 shows only meta information records belonging to a single tree that is derived from a single root node "/1," the document management server 10 can actually register meta information records belonging to multiple trees, such as a tree derived from a root "/1" and a tree derived from a root "/2."

It should be noted that the items of the meta information illustrated in FIG. 5 are only examples. For example, in addition to the listed items, a path name indicating a storage location within the document DB 100 where the document content 320 of the ID-added document is stored may be registered in the derivation relationship DB 110. If the document DB 100 is provided with a function of searching for the document content 320 by using the content ID, the content ID, in place of the document storage path, may be registered in the meta information record.

Here, FIG. 5 merely expresses the data managed by the derivation relationship DB 110 from a viewpoint of data content, and does not therefore specify any specific expression form or database form. For example, the derivation relationship DB 110 may be configured as a general relational database, or a database in which a XML (eXtensible Markup Language) document that describes meta information other than the management ID is registered with the management ID being used as a key.

Figure 6:
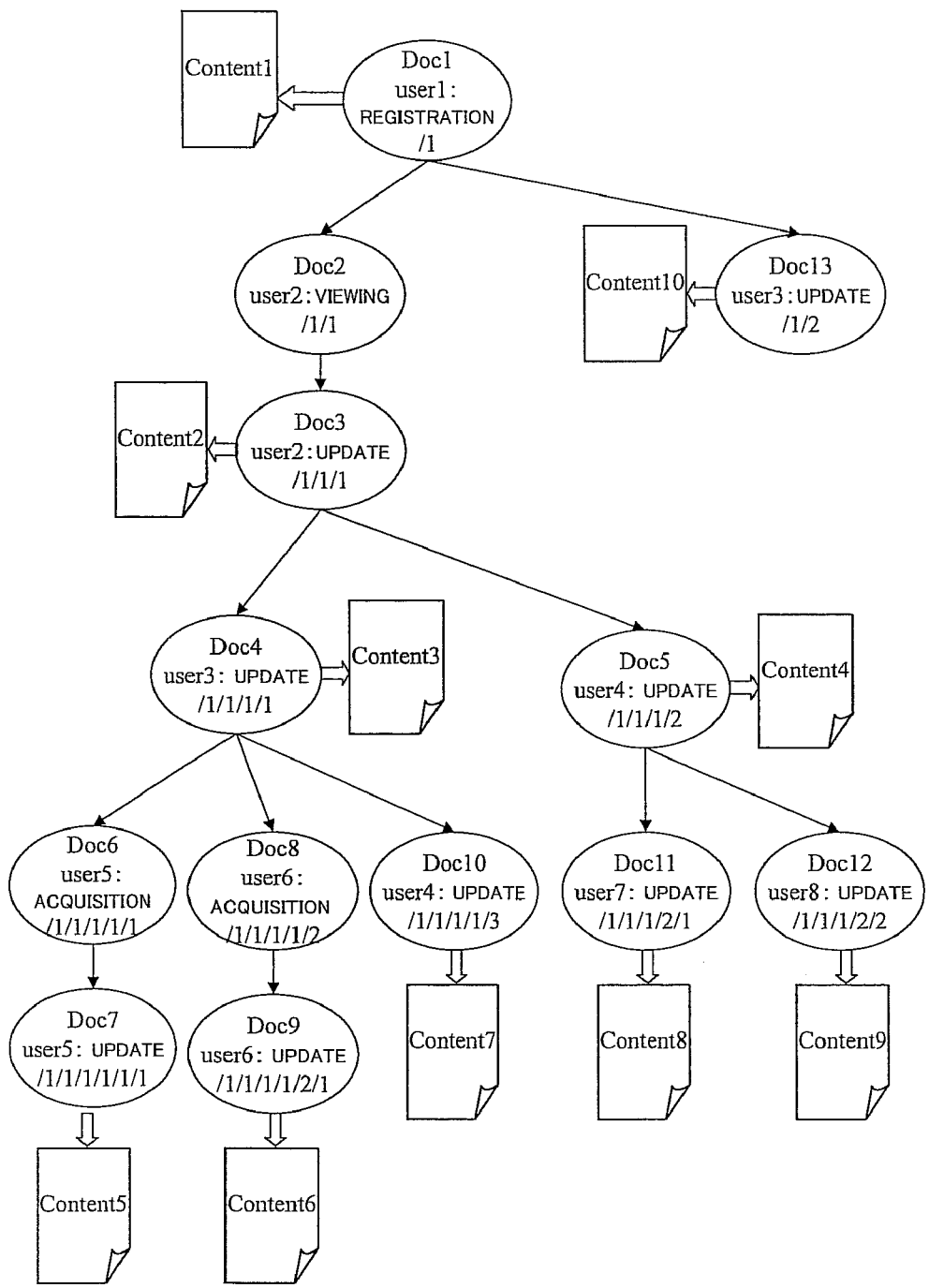
FIG. 6 is a view schematically showing a tree structure formed by management IDs in the data content shown in FIG. 5.

The data content of the derivation relationship DB 110 shown in FIG. 5 forms a tree structure as shown in FIG. 6, with a management ID being represented as a node and a parent-child relationship being represented as an edge.

Here, the log of the documents shown in FIGS. 5 and 6 having management IDs "Doc1" to "Doc7" will be described below in time sequence.

In this example, a "registration" operation of a document (form) is first performed by a client terminal of user1. Here, the "registration" operation refers to an operation for registering in the document management server 10 a document which has not been registered in the document management server 10 (i.e. a document having no management ID). In accordance with this operation, an ID-added document "Doc1" including meta information having a management ID "Doc1," no parent ID, and an operation type "registration," and the document content of that document are sent from the client terminal of user1 to the document management server 10. In response, the document management server 10 registers the document content and the meta information in the ID-added document "Doc1" in the document DB 100 and the derivation relationship DB 110, respectively. Here, the document management server 10, recognizing that the operation type is "registration" and the parent ID is vacant, determines that this ID-added document is a root (initiator) of a new tree, rather than a child of any ID-added document that has been already registered in the document management server 10, and sets a value of a node address ("/1" in this example) accordingly. Hereinafter, for the purpose of identification, the document content which is registered is represented by content ID "Content1."

Thereafter, user1 distributes the ID-added document thus registered to another user, user2. Such distribution can be achieved by sending to each user an electronic mail having the ID-added document attached thereto.

Thereafter, another user user2 views the ID-added document "Doc1" by using the document operating unit 200 of his/her own client terminal. Here, what is actually viewed by user2 is the document content having a content ID "Content1." As a result of viewing, the client terminal generates an ID-added document "Doc2," which is then registered in the document management server 10. The meta information of this ID-added document includes a management ID "Doc2," a parent ID "Doc1," an operator "user2," and an operation type "viewing." Further, because the document content is not changed by the "viewing" operation, the document content retains "Content1." When the document content is not changed by an operation as described above, the client terminal 20 may send an ID-added document with no document content to the document management server 10. Recognizing, from the value of the parent ID of the received ID-added document, that the document "Doc2" is a child, particularly a first child, of the document "Doc1," the document management server 10 sets the node address of the document "Doc2" to "/1/1."

With this operation, the ID-added document "Doc1" that has been present in the client terminal 20 of user2 before this operation is replaced with the ID-added document "Doc2" by means of the derivation relationship incorporating unit 204. Specifically, the derivation relationship incorporating unit 204 changes the management ID 312 in the meta information 310 of the earlier ID-added document "Doc1" to the management ID "Doc2" that was newly issued, and also sets the management ID "Doc1" of the earlier document "Doc1" as a value of the parent ID 314. Further, the derivation relationship incorporating unit 204 changes a value of the operation type in the log information 316 to "viewing," which is the type of operation performed this time, changes a value of the operation time to the time and date of viewing, and changes a value of the operator to user2. Here, because the content of a document remains unchanged by the "viewing" operation, the value of the document content 320 remains "Content1."

As described above, the ID-added document "Doc1," once being viewed, is replaced with the ID-added document "Doc2" after viewing. Accordingly, after such replacement, the ID-added document "Doc1" itself does not exist in the client terminal 20 and instead the ID-added document "Doc2" exists in the client terminal 20.

Thereafter, when user2 edits the ID-added document "Doc2" by using the document operating unit 200 of her/his own client terminal 20 and then issues an instruction for "registration as an updated version" on the operation menu, the client terminal 20 generates an ID-added document "Doc3" having a value of the management ID 312 "Doc3," a value of the parent ID 314 "Doc2," and a value of the operation type "update." The client terminal 20 then replaces the ID-added document "Doc2" obtained prior to the "update" operation with the ID-added document "Doc3" which is newly generated, and also registers the ID-added document "Doc3" in the document management server 10. As a result of editing, the document content "Content1" is changed to "Content2." Further, the record corresponding to the management ID "Doc3" is registered in the derivation relationship DB 110 of the document management server 10.

Then, user2 distributes the ID-added document "Doc3" to user3 and user4 via an electronic mail and the like.

Next, the document operating unit 200 of the client terminal 20 of user3 performs an "update (registration as an updated version)" operation with respect to the ID-added document "Doc3" distributed by the user2. The client terminal 20 of user3 generates a new ID-added document "Doc4" including the document content "Content3" which is obtained as a result of the update, a parent ID "Doc3," and an operation type value "update," and registers the ID-added document "Doc4" in the document management server 10. Here, the ID-added document "Doc3" in the client terminal 20 of user3 is replaced with this ID-added document "Doc4." Similarly, the document-operating unit 200 of the client terminal 20 of user4 performs an "update" operation with respect to the ID-added document "Doc3," and a new ID-added document "Doc5" including the document content "Content4," a parent ID "Doc3," and an operation type value "update" is generated and registered in the document management server 10. Then, the ID-added document "Doc3" in the client terminal 20 of user4 is replaced with the ID-added document "Doc5."

Then, user5 operates the document operating unit 200 of his/her own client terminal 20 to perform an "acquisition" operation for acquiring the document "Doc4" from the document management server 10. Here, the "acquisition" operation refers to downloading or copying of an ID-added document stored in a storage device of the document management server 10 or in storage devices of other client terminals 20 by using the document-operating unit 200 of the client terminal 20. With this "acquisition" operation, an ID-added document "Doc6" with the parent ID "Doc4" and the operation type value "acquisition" is generated and registered in the document management server 10. Here, as the document content of the ID-added document 300 remains unchanged as a result of the "acquisition" operation, the document content of the ID-added document "Doc6" remains "Content3," which is the document content of the ID-added document "Doc4" prior to the operation.

Thereafter, user5 performs an "update" operation with respect to the ID-added document "Doc6" by using his/her own client terminal 20. Consequently, a new ID-added document "Doc7" including a document content "Content5," a parent ID "Doc6," and a value of the operation type "update" is generated and registered in the document management server 10 by client terminal 20 of user5. Here, the ID-added document "Doc6" in the client terminal 20 is replaced with the ID-added document "Doc7."

Heretofore, how the information of document operations is registered in the present system has been described using the data content of the derivation relationship DB 110 as examples.

Referring back to FIG. 4, the organization information DB 120 is a database that stores information concerning organizations forming a group such as a company that uses the documents managed by the document management server 10. The organization information DB 120 stores information representing a structure of an organization hierarchy formed by multiple organizations and information concerning members belonging to each organization.

Figures 7, 8:
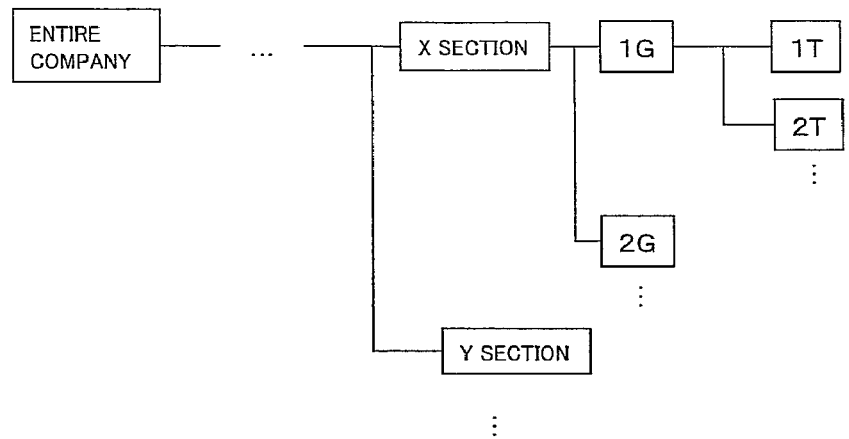
FIG. 7 is a view showing an example structure of an organization hierarchy formed of multiple organizations.
FIG. 8 is a view showing example data content registered in an organization information DB.

In general, a group such as a company is composed of multiple organizations forming a hierarchical structure, as shown in FIG. 7. The organization information DB 120, in the form of a database such as a table shown in FIG. 8, for example, stores information representing the organization hierarchy shown in FIG. 7. Referring to FIG. 8, in regards to each of the organizations forming a group, a name of a higher level organization located one level higher than the noted organization in the organization hierarchy is stored in association with the name of the noted organization. For example, an X section located one level higher than 1G (group) in the organization hierarchy shown in FIG. 7 is stored in association with the organization name 1G as a higher level organization thereof in the table shown in FIG. 8. Further, with regard to 1T (team) and 2T, which are organizations located at a lower level with respect to 1G in the example shown in FIG. 7, 1G is associated with each of the organization names 1T and 2T as their higher level organization in the table shown in FIG. 8. It should be noted that the table shown in FIG. 8 is only an example representation form of information that represents the structure of an organization hierarchy, and the information may be stored in the organization information DB 120 in any other representation form, so long as the structure of an organization hierarchy can be represented.

The organization information DB 120 further stores information concerning members belonging to each of the organizations forming a group. FIG. 9 shows an example information content concerning members of each organization stored in the organization information DB 120. The information in one row in the table shown in FIG. 9 represents a record corresponding to one member belonging to each organization. In the example of FIG. 9, in association with the user ID of each member, items including the organization to which the member belongs (hereinafter also referred to as a "belonging organization") and his/her (managerial) position are registered. The user ID, which is identification information of a user in the document management system, is allocated, on a one-to-one basis, to each member of a group that uses the document management system. In the item of the belonging organization, information representing an organization to which a noted member belongs among multiple organizations forming a group is registered. Here, there are cases where one person performs business in multiple organizations in a company, for example. In this case, information indicating that the member belongs to the multiple organizations can be simply registered in the item of the belonging organization. In the example shown in FIG. 9, as a member having a user ID "user8" performs both business of the organization 1T and business of the organization 2T, information "1T, 2T" is registered in the item of the belonging organization in the record corresponding to user8. Further, the item of the managerial position indicates whether or not each member in the organization is in a managerial position. In the table shown in FIG. 9, "◯" registered in the item of managerial position in the record of each member indicates that the member is in a managerial position, such as a leader in the organization, whereas "X" registered in this item indicates that the member is not in a managerial position.

The representation form of the information representing members of each organization in the organization information DB 120 is not limited to the example shown in FIG. 9. For example, rather than registering the record for each member in the organization information DB 120, it is possible to register a record for each organization and register, in the record corresponding to each organization, user IDs of members and user IDs of users in managerial positions in the organization.

With the derivation relationship DB 110 and the organization information DB 120 described above, the information representing the operator of each ID-added document registered in the derivation relationship DB 110 is checked against the information representing members of each organization registered in the organization information DB 120 in the document management server 10, so that the organization to which the operator of each ID-added document belongs can be specified. Further, with the use of the information representing the structure of the organization hierarchy stored in the organization information DB 120, the position of the organization to which the operator of the noted ID-added document belongs in the organization hierarchy can be specified.

Referring again to FIG. 4, the request processing unit 140 provides a service by using the derivation relationship DB 110, in response to a service request including the management ID transmitted from the client terminal 20. A service to be provided by the request processing unit 140 may include search of the latest version of a document corresponding to the management ID for which the service is being requested. Another example service may be a service of providing an initiator (root) document corresponding to the management ID for which the service is being requested or the log information of the initiator, or a service of providing the history of the management ID; that is, an operation history of the documents from the initiator up to the management ID (i.e. an information list indicating who performed what kind of operation, and so on). A further example service may be a service of receiving a specified search condition concerning the attribute items registered in the derivation relationship DB 110 and providing a list of ID-added documents that satisfy the search condition. In association with this service, the request processing unit 140 may receive selection of an ID-added document desired by the user from among the list and provide the selected ID-added document. Here, the service of searching for the latest version described above may be regarded as a service of providing a search result concerning a search condition that "the operation date and time is the latest." Also, the service of providing information of the initiator document described above may be regarded as a service of providing a search result concerning a condition that specifies "a document with a node address corresponding to a root." In addition, a still further example service may be a service of providing a display screen showing the tree structure representing the derivation relationships of the ID-added documents based on the derivation relationship DB 110, receiving selection of an ID-added document desired by the user on the display screen, and providing the selected ID-added document.

The service request is issued by reference to an ID-added document held by the client terminal 20. For example, when a user operates the document-operating unit 200 of the client terminal 20 to open an ID-added document, the document-operating unit 200 provides a service menu using the derivation relationship, receives the user's designation of a desired service among services in the menu, and transmits to the request-processing unit 140 of the document management server 10 a service request including the document ID of the ID-added document and a code indicating the designated service. At this time, a search condition that is input through a user interface screen provided for designating a search condition concerning the attribute items including the user identification information, the operation time and date, and so on, may be transmitted to the request processing unit 140 in combination with the service request. Also, in addition to the management ID, the code indicating a designated service, and the search condition described above, other information including identification information of a user who issued the instruction, authentication information input by a user, and the like, may also be transmitted from the client terminal 20 to the request-processing unit 140.

Alternatively, it is also conceivable to regard a user's designation of a service as one "operation" and assign a new management ID to the "operation." In this case, it is possible to generate an ID-added document including a code of the designated service as an operation type and the management ID of the original ID-added document that was used at the time of designation of a service as a parent ID, and transmit this ID-added document to the document management server 10 as a service request. In this case, the request processing unit 140 determines a service to be provided by reference to the information of an operation type in the ID-added document that is received and uses the parent ID of that ID-added document as a start point when tracing back the derivation relationship.

Upon receiving a service request from the client terminal 20, the request processing unit 140 traverses, starting from the management ID for which a service is being requested, a tree configured by the derivation relationships between the management IDs and the parent IDs registered in the derivation relationship DB 110. The request processing unit 140 then uses the information acquired as a result of traverse to perform the service requested by the user.

Further, in the present exemplary embodiment, the request processing unit 140 includes an access control unit 142. The access control unit 142, upon receiving a service request that requests provision of a specific document from the client terminal 20, determines whether or not to allow provision of that document to the client terminal 20. With regard to the service of providing a list of ID-added documents that satisfy the designated search condition or a display screen showing a tree structure representing the derivation relationships among the ID-added documents, receiving selection of an ID-added document desired by a user, and providing the selected ID-added document as described above, for example, the access control unit 142 determines whether or not to allow provision of the selected ID-added document to the user.

In the present exemplary embodiment, access control with regard to documents is performed such that, in a case where a document is distributed from a higher level organization to a lower level organization in the organization hierarchy and the document is then updated at each distribution destination (each organization), the lower the level within the organization hierarchy of the organization to which the document is distributed, the less users are allowed to access the document in that organization. Distribution and update of a document such as an activity evaluation document for use in the performance appraisal review in companies will be described as an example of the above situation. This type of document is first created by a person in a managerial position in a higher level organization as a document in which the course of action determined by the higher level organization is described, and is then distributed to a person in a managerial position (e.g. a leader) in each of the lower level organizations. The person in a managerial position in each lower level organization writes a goal and content of the action of his/her own organization in the distributed document to thereby update the document, and then distributes the updated document to members of the organizations. Each member of the organization then writes a personal goal and content of the action in the document provided from the leader of the organization. In such a case, the content written in the document by the leader of each organization, such as the content of action of each organization, may include information such as a theme of research that will not be disclosed to other organizations. Further, the content written in the document by each individual may include information which will not be disclosed to employees other than a person who is a boss of the individual (e.g. a leader of the organization to which the individual belongs), such as information concerning a career plan of the individual.

In the example situation described above, the access control unit 142 performs access control of ID-added documents by reference to the information stored in the derivation relationship DB 110 and the organization information DB 120. Specifically, the access control unit 142 determines whether or not an access request to an ID-added document satisfies the following condition 1 or condition 2, to thereby determine whether or not to allow the requesting user to access the requested ID-added document.

(Condition 1):

In a tree structure represented by the derivation relationships of ID-added documents, there is allowed an access request from a requesting user for access to an ID-added document included in a partial tree in which an ID-added document registered in the document management server 10 by an operation of the requesting user himself/herself is a root node.

(Condition 2):

When the operator of a requested ID-added document belongs to any of organizations included in a route which is identified by tracing back the organization hierarchy from an organization to which the requesting user belongs and simultaneously the log of the requested ID-added document indicates that the requested ID-added document was updated and registered sequentially by users from a user in a managerial position in a higher-level organization to a user in a managerial position in an organization located one level lower than the previous higher level one by one in the organization hierarchy, an access request for access to the requested ID-added document is allowed.

The Condition 1 is a condition for authorizing a certain user to access an ID-added document which is registered in the document management server 10 by an operation of his/her own and any ID-added documents that are derived from that ID-added document. For example, when a person in a managerial position in an organization updates and registers an ID-added document and a member of the same organization then writes in the ID-added document for updating and registration, the person in a managerial position in the organization is authorized to access the ID-added document.

The condition in the former half of the Condition 2 is a condition for allowing a requesting user to access only an ID-added document which is updated and registered by a user belonging to an organization to which the requesting user belongs or by a user belonging to a lineal higher-level organization of the organization to which requesting user belongs. In accordance with this condition, a user belonging to the organization 1T in the organization hierarchy shown in FIG. 7, for example, is not authorized to access an ID-added document which is updated and registered by a user belonging to organizations that are not located at directly higher levels of the organization 1T, such as the organizations 2T and Y section (i.e., that are not lineal higher-level organizations of 1T).

In accordance with the latter half of the Condition 2, it is determined that an ID-added document which is distributed and updated sequentially by users from a person in a managerial position in a higher level organization to a person in a managerial position in a lower level organization has passed an authorized development route, and an access to an ID-added document which has not passed the authorized development route is prohibited. For example, when an ID-added document is updated and registered by a person in a managerial position in the organization X section in the organization hierarchy and the resulting ID-added document is then updated and registered by a person in a managerial position in the organization 1T which is one level lower than the organization 1G, without having been updated and registered by a person in a managerial position in the organization 1G which is one level lower than the organization X section, it is determined that the resulting ID-added document has not passed the authorized development route.

Detailed processing procedures to be performed by the access control unit 142 will be described below.

Figure 10:
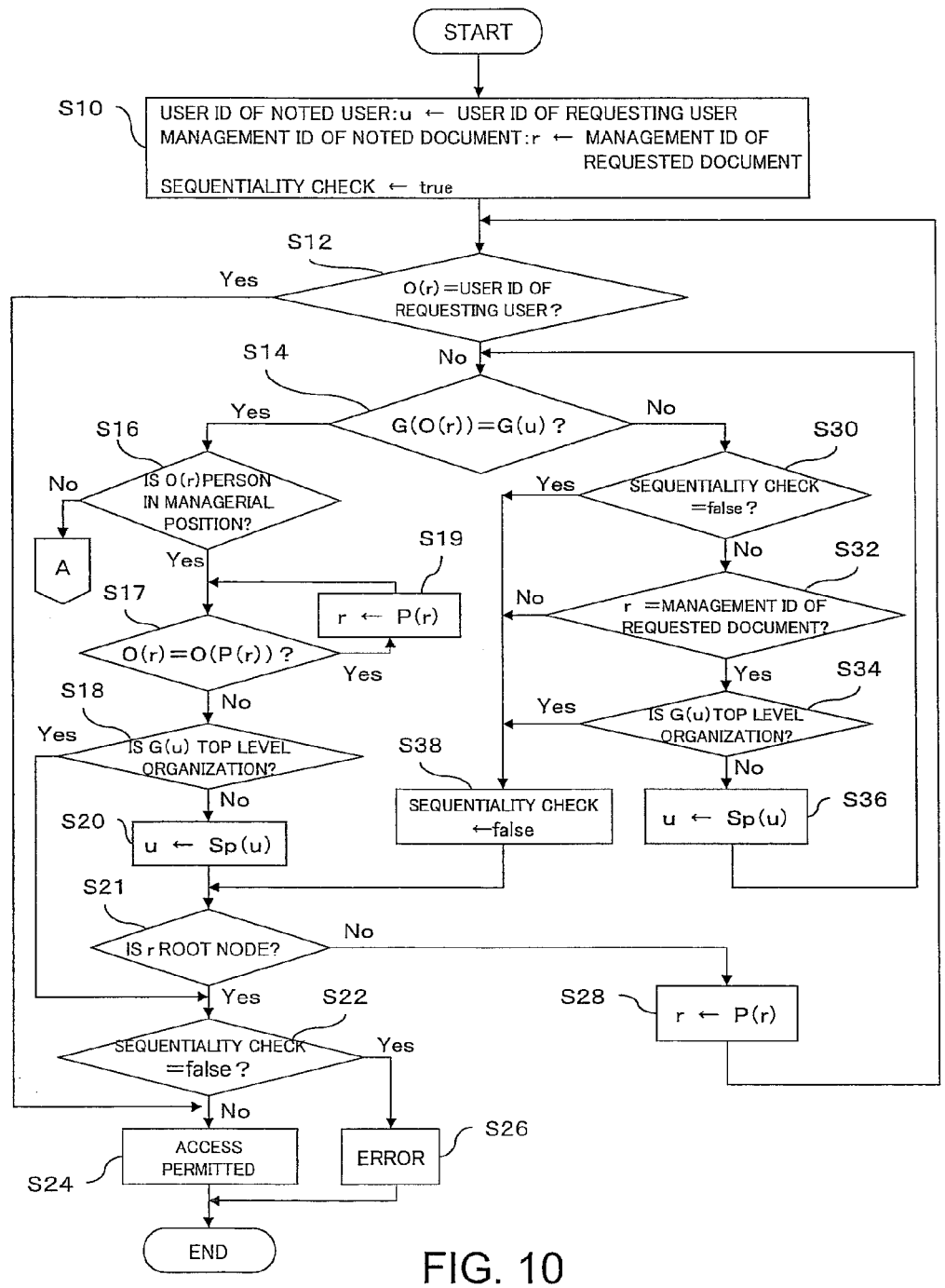
FIG. 10 is an example flowchart showing a part of a processing procedure performed by the document management server when receiving a request for access to an ID-added document.
Figure 11:
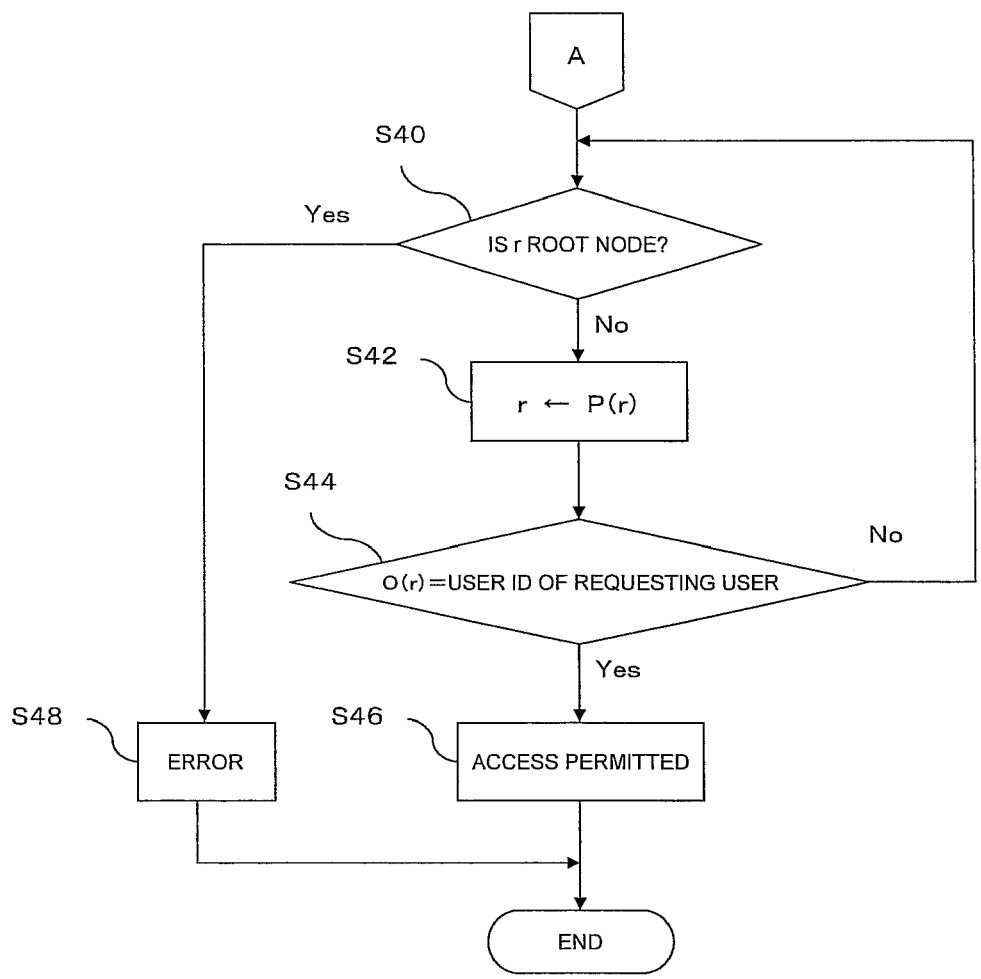
FIG. 11 is an example flowchart showing a part of a processing procedure performed by the document management server when receiving a request for access to an ID-added document.
Figure 12:
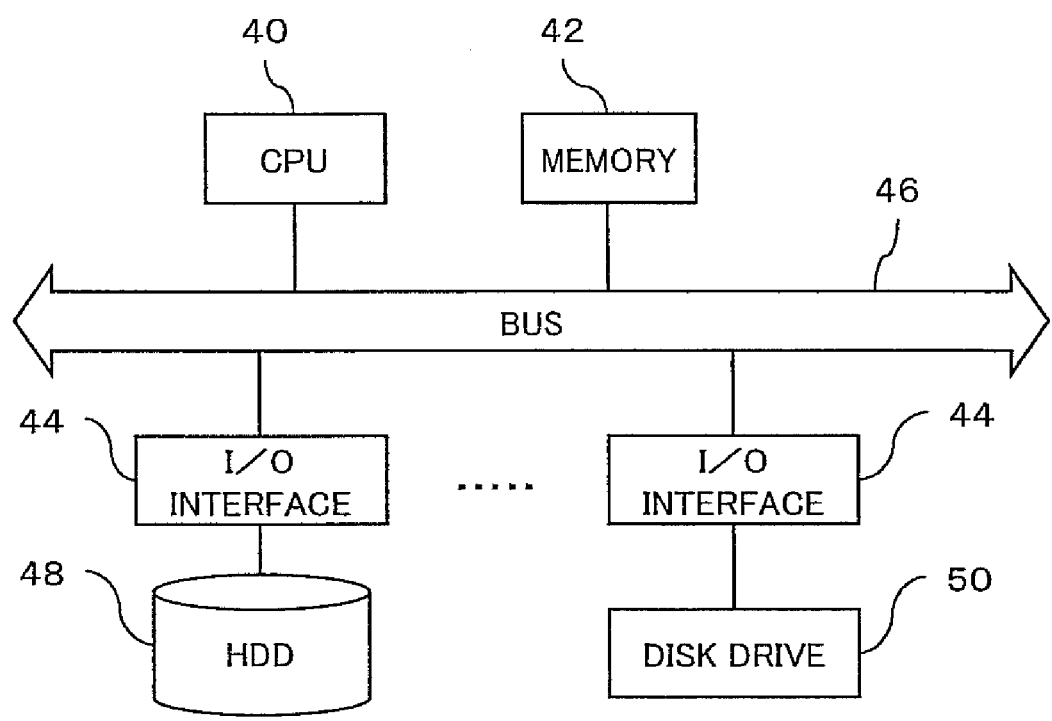
FIG. 12 is a view showing an example hardware structure of a computer.

FIGS. 10 and 11 show an example processing procedure for determining whether or not to allow provision of a designated ID-added document in the access control unit 142.

When it becomes necessary to determine whether or not to allow provision of an ID-added document to a user in the request processing unit 140, the access control unit 142 starts the processing procedure shown in FIG. 10.

Referring to FIG. 10, the access control unit 142 performs an initialization processing in step S10. In step S10, a user ID of a user who requested provision of a document is set as a noted user ID (hereinafter also referred to as a "noted user u"), and a management ID of an ID-added document which is requested is set as a noted management ID (hereinafter also referred to as a "noted document r"). Further, in step S10, a value of a flag called "sequentiality check" is set to true. The sequentiality check flag indicates whether or not the above Condition 2 is satisfied.

Then, in step S12, the access control unit 142, by reference to the derivation relationship DB 110, reads out a record in which the noted document r is registered as the management ID and acquires a user ID registered in the item of the operator in the record (i.e. the user ID of the operator of the noted document r). The access control unit 142 then determines whether or not the user ID which is acquired is identical with the user ID of the requesting user who issued a request for providing an ID-added document. In the flowchart shown in FIG. 10, the user ID of the operator of the noted document r, which is acquired from the derivation relationship DB 110, is described as "O(r)," which will be consistently used in the following description.

If the value of O(r) is not identical with the user ID of the requesting user in step S12, the processing proceeds to step S14.

In step S14, the access control unit 142 refers to the organization information DB 120 to acquire an organization to which the operator of the noted document r belongs and which is registered in association with O(r), which is the user ID of the operator of the noted document r and an organization to which the requesting user belongs and which is registered in association with the noted user u, and then determines whether or not the two organizations match. In the flowchart shown in FIG. 10, an organization to which a user having a specific user ID: uid belongs and which is acquired from the organization information DB 120 is described as "G(uid)," which will be used in the following description. In accordance with this description, the organization to which the operator O(r) of the noted document r belongs is described as G(O(r)) and the organization to which the noted user u belongs is described as G(u).

It should be noted that, in the example processing to be described here, the determination as to whether or not the organizations G(O(r)) and G(u) match in step S14 is performed without consideration of inclusion relations among the organizations. For example, in the organization hierarchy having the structure shown in FIG. 7, the organization 1G is located one level higher than the organizations 1T and 2T and can be considered to include the organizations 1T and 2T. In the matching processing between organizations in step S14, however, it is determined the organization 1G does not match the organization 1T or 2T. Further, in regards to a user belonging to multiple organizations such as user8 in the table shown in FIG. 9, if either one of the multiple organizations to which the user belongs matches the organization to which a target user belongs, it is determined that the organizations match each other.

If it is determined that the organization G(O(r)) to which the operator of the noted document r belongs corresponds to the organization G(u) to which the noted user u belongs, the processing proceeds to step S16.

In step S16, the access control unit 142 determines, by reference to the organization information DB 120, whether or not the operator O(r) of the noted document r is a person in a managerial position. If the information with the content shown in the table in FIG. 9 is stored in the organization information DB 120, for example, the operator O(r) is determined to be a person in a managerial position if "○" is registered in the item of managerial position in the record corresponding to the operator O(r), and the operator O(r) is not determined to be a person in a managerial position if "X" is registered.

If in step S16 it is determined that the operator O(r) of the noted document r is a person in a managerial position, the processing proceeds to step S17. In step S17, the access control unit 142 traces back the ID-added documents (nodes) one by one from the noted document r which serves as a start point in the tree structure represented by the derivation relationships of the ID-added documents, and, when a node in which the value of the operation type is "update" or "registration" is found for the first time, acquires the operator of that node which is found. Specifically, the access control unit 142 acquires a record having a management ID which is registered as a parent ID in the record of the noted document r in the derivation relationship DB 110, and, if the value of the operation type registered in the record thus acquired is "update" or "registration," the access control unit 142 acquires the user ID registered in the item of the operator included in the record. If the value of the operation type is a value other than "update" and "registration," the access control unit 142 then further acquires a record including, as a management ID, the value of the parent ID registered in the previously acquired record and determines whether or not the value of the operation type in the newly acquired record is "update" or "registration." With repetition of such processing, the access control unit 142 acquires the operator O(P(r)) corresponding to the management ID (represented by "P(r)" in the flowchart shown in FIG. 10) of a node with the operation type "update" or "registration" which is first found while tracing back the tree structure from the noted document r. Here, if the noted document r is a document corresponding to a root node of a tree structure; in other words, if the record including the noted document r as a management ID includes a value of the parent ID "null," it is not possible to trace back the tree structure from the noted document r as a start point. Accordingly, the access control unit 142 sets, as a value of the operator O(P(r)), information indicating that the operator O(P(r)) cannot be acquired (e.g. "null"). Once the value of the operator O(P(r)) is determined, the access control unit 142 determines whether or not the operator O(P(r)) matches the operator O(r) of the noted document r. If the two operators are not identical, the processing proceeds to step S18. If the two operators are identical, the processing proceeds to step S19, where the node P(r) having the operation type "update" or "registration" which is first found while tracing back the tree structure from the noted document r is set as a new noted document r. After step S19, the determination in step S17 is repeated.

Here, the node P(r) can be considered to be an ID-added document corresponding to an ancestor of the requested ID-added document in the tree structure represented by the derivation relationships of the ID-added documents. In general, in a tree structure, a node included in a route identified by tracing back the tree structure from a certain noted node to a root node is referred to an "ancestor" of the noted node.

In step S18, the access control unit 142 refers to the organization information DB 120 to determine whether or not the organization G(u) to which the noted user u belongs is located at the top level in the organization hierarchy. If the data content of the table shown in FIG. 8 is stored in the organization information DB 120, for example, the access control unit 142 checks the higher level organization corresponding to the organization G(u) in the organization information DB 120. Then, the access control unit 142 determines that the organization G(u) is not located at the top level in the organization hierarchy if a name of the higher level organization is registered, and determines that the organization G(u) is located at the top level in the organization hierarchy if a name of the higher level organization is not registered. (For example, in FIG. 8, the value of the higher level organization "null" is registered corresponding to the organization name "entire company.") The processing proceeds to step S20 if the organization G(u) is not located at the top level, and proceeds to step S22 if the organization G(u) is located at the top level.

In step S20, the access control unit 142, by reference to the organization information DB 120, sets, as a new noted user u, a user ID of any one of members belonging to the organization which is located one level higher than the organization to which the noted user u belongs in the organization hierarchy. If the data content of the tables shown in FIGS. 8 and 9 is registered in the organization information DB 120, the access control unit 142 acquires the organization to which the noted user u belongs by reference to FIG. 9 and then, by reference to FIG. 8, acquires the higher level organization corresponding to the organization to which the noted user u belongs. Then, the access control unit 142 refers to the table shown in FIG. 9 once again, to acquire a user ID included in one of the records including the value of the organization which is thus acquired in the item of belonging organization. In the flowchart shown in FIG. 10, a user belonging to an organization which is one level higher than the organization to which the noted user u belongs in the organization hierarchy, which is obtained by a series of processing described above, is described as Sp(u), which will be used in the following description.

In step S16, if it is determined that the operator O(r) of the noted document r is not a user in a managerial position, the access control unit 142 performs a processing procedure shown in FIG. 11, as will be described below.

After step S20, the access control unit 142 determines whether or not the noted document r corresponds to a root node in the tree structure represented by the derivation relationships of the ID-added documents in step S21. Specifically, the noted document r is determined to be a root node if, among the records stored in derivation relationship DB 110, a record which has the noted document r as a management ID includes a value of the parent ID "null," whereas the noted document r is not determined to be a root node if other values are registered as the parent ID. If the data content shown in FIG. 5 is registered in the derivation relationship DB 110, for example, the node with the management ID "Doc1", which includes a value of the parent ID "null," corresponds to a root node in the tree structure of the derivation relationships (see FIG. 6).

If it is determined in step S21 that the noted document r is a root node, it is then determined whether or not the sequentiality check flag is set to false in step S22. If the sequentiality check flag is not set to false, then access is permitted (step S24). If the sequentiality check flag is set to false, on the other hand, access is not permitted and an error will result (step S26).

If it is determined in step S21 that the noted document r is not a root node, the processing proceeds to step S28. In step S28, the access control unit 142 performs processing similar to that described above with reference to step S17. Specifically, the access control unit 142 acquires a management ID P(r) of a node having the operation type "update" or "registration" which is first found while tracing back the tree structure represented by the derivation relationships of the ID-added documents from the noted document r, and sets the management ID P(r) thus acquired to a new noted document r. Thereafter, the processing returns to step S12.

There has been described an example processing procedure in a case where it is determined in step S14 that the organization G(O(r)) to which the operator of the noted document r belongs and the organization G(u) to which the noted user u belongs are identical. Hereinafter, there will be described an example processing procedure in a case where it is determined in step S14 that the organizations G(O(r)) and G(u) do not match. In this case, as a result of the determination in step S14, the processing proceeds to step S30.

In step S30, it is determined whether or not the value of the sequentiality check flag is set to false. The processing proceeds to step S38 if the value is set to false, and proceeds to step S32 if the value is not set to false. Here, because the value of the sequentiality check flag is set to true in the initialization processing performed in step S10, if the determination in step S30 is made for the first time since the start of processing of the flowchart shown in FIG. 10, NO is determined in step S30 and the processing proceeds to step S32.

In step S32, it is determined whether or not the noted document r is the management ID of the requested ID-added document. Then, the processing proceeds to step S34 if the noted document r is the management ID of the requested ID-added document, and proceeds to step S38 if the noted document r is not the management ID of the requested ID-added document. If the determination results are negative in all the determination steps S12, S14, and S30 after the initialization processing in step S10 and then the determination is made in step S32, the value of the noted document r remains the management ID of the requested ID-added document which is set in the initialization processing. Consequently, the determination result is affirmative (YES) in step S32 and the processing proceeds to step S34. On the other hand, if the determination is made in step S32 after the value of the noted document r has been changed even once in step S28 since the start of the processing procedure shown in FIG. 10, the determination result is negative (NO) in step S32 and the processing proceeds to step S38.

In step S34, the access control unit 142, by reference to the organization information DB 120, determines whether or not the organization G(u) to which the noted user u belongs is located at the top level in the organization hierarchy. The determination processing in step S34 is similar to the determination processing in step S18 described above. Then, the processing proceeds to step S36 if G(u) is not the top level organization and proceeds to step S38 if G(u) is the top level organization.

If there exists a higher level organization of the organization to which the noted user u belongs, in step S36 the access control unit 142 sets, as a new noted user u, a user ID of a user belonging to an organization located one level higher in the organization hierarchy than the organization to which the noted user u belongs. After step S36, the processing returns to step S14.

If the determination results are affirmative (YES) in step S30, negative (NO) in step S32, or affirmative (YES) in step S34, the value of the sequentiality check flag is set to false in step S38. After step S38, the processing proceeds to step S21.

With the processing loop including steps S14, S30, S32, S34, and S36, it is determined whether or not the operator of the requested ID-added document belongs to any one of the organizations included in the route which is identified by tracing back the organization hierarchy from the organization to which the requesting user belongs to the top level organization; that is, whether or not the condition in the former half of the Condition 2 described above is satisfied.

According to the procedure shown in FIG. 10 described above, the information concerning the operators of the ID-added documents obtained by tracing back the tree structure (steps s19 and S28) represented by the derivation relationships of the ID-added documents from the management ID of the requested ID-added document is compared with the information concerning the members of the organizations obtained by tracing back the organization hierarchy (steps S20 and S36) by using the user ID of the requesting user, thereby confirming whether or not the position of the requesting user in the organization hierarchy corresponds to the distribution route of the requested ID-added document.

Referring now to FIG. 11, there will be described an example processing procedure to be performed if it is determined in step S14 that the operator of the noted document r is not a person in a managerial position. If it is determined that the operator of the noted document r is not a person in a managerial position, the condition in the latter half of the Condition 2 described above (i.e., a condition that the log of the requested ID-added document indicates that the requested ID-added document was updated and registered sequentially by users from a user in a managerial position in a higher level organization to a user in a managerial position in an organization located at one level lower than the previous higher level organization one by one in the organization hierarchy) is not satisfied. Accordingly, in the processing procedure shown in FIG. 11, it is determined whether or not the Condition 1 described above is satisfied.

If the determination result in step S16 in FIG. 10 is negative (NO), the processing proceeds to step S40 in FIG. 11. In step S40, the access control unit 142 determines whether or not the noted document r corresponds to a root node in the tree structure represented by the derivation relationships of the ID-added documents, similar to the processing of step S21 described above with reference to FIG. 10. If the noted document r is a root node, error processing in step S48 is performed, and the processing terminates.

If it is determined that the noted document r is not a root node, the processing proceeds to step S42, in which, similar to the processing in step S28 described above with reference to FIG. 10, the access control unit 142 sets the management ID of a node having the value of the operation type "update" or "registration" which is first found while tracing the tree structure of the derivation relationships from the noted document r to a new noted document r. Then, in step S44, it is determined whether or not the operator O(r) of the noted document r is identical with the user ID of the requesting user. The processing proceeds to step S46 if the two are identical, and returns to step S40 if the two are not identical. In step S46, the access control unit 142 permits access to the requested ID-added document and the processing terminates.

If the access control unit 142 permits access (in steps S24 and S46) in accordance with the processing procedure shown in FIGS. 10 and 11, the request processing unit 140 acquires the document content corresponding to the requested ID-added document from the document DB 100 and transmits the acquired document content to the client terminal 20. On the other hand, if the access control unit 142 determines an error (in steps S26 and S48) in accordance with the processing procedure shown in FIGS. 10 and 11, the request processing unit 140 does not transmit the document content corresponding to the requested ID-added document to the client terminal 20. In this case, the request processing unit 140 causes the display unit of the client terminal 20 to display an error message indicating that access is not permitted.

Below will be described specific examples of access control by the processing procedure shown in FIGS. 10 and 11 performed when the example data content shown in the table of FIG. 5 is registered in the derivation relationship DB 100 and the example data content shown in the tables of FIGS. 8 and 9 is registered in the organization information DB 120.

SPECIFIC EXAMPLE 1

With reference to FIGS. 5 and 6, processing of the access control unit 142 to be performed when a user having a user ID "user5" requests provision of an ID-added document with a management ID "Doc7" will be described as an example which satisfies the Condition 1 described above. In this case, in step S10 of FIG. 10, the noted user u is set to "user5," and the noted document r is set to "Doc7." As a record having the management ID "Doc7" includes a value of the operator "user5" in the table of FIG. 5, in step S12 of FIG. 10, the operator of the noted document "Doc7" is user 5, which matches the noted user u. Consequently, access is permitted (step S24).

SPECIFIC EXAMPLE 2

With reference to FIGS. 5 and 6, processing of the access control unit 142 to be performed when a user having a user ID "user3" requests provision of an ID-added document with a management ID "Doc7" will be described as another example which satisfies the Condition 1 described above. In this case, in step S10 of FIG. 10, the noted user u is set to "user3," and the noted document r is set to "Doc7." As the operator of the noted document "Doc7" is user 5, which does not match user3 that is the noted user u in step S12 of FIG. 10, the processing proceeds to step S14. In step S14, with reference to the organization information DB 120 (FIG. 9), the organization 1T to which user5 which is the operator of the noted document r "Doc7" belongs is found to be identical with the organization 1T to which user3 that is the noted user u belongs. Consequently, the processing proceeds to step S16. Here, because user5 which is the operator of the noted document r "Doc7" is not a person in a managerial position (see FIG. 9), the processing proceeds from step S16 to step S40 in FIG. 11. In step S40 in FIG. 11, as the noted document r "Doc7" is not a root node of a tree structure of the derivation relationships of the documents, the processing proceeds to step S42. In step S42, the management ID "Doc4" of a node with an operation type "update" which is first found while tracing back the tree structure from the noted document r "Doc7" as a start point is set to a new noted document r. Then, in step S44, as the operator of the new noted document r "Doc4" is user3, which matches user3 which is the user ID of the requesting user, access is permitted (step S46).

SPECIFIC EXAMPLE 3

Processing of the access control unit 142 to be performed when a user having a user ID "user5" requests provision of an ID-added document with a management ID "Doc4" will be described as an example which satisfies the Condition 2 described above. In this case, in step S10 of FIG. 10, the noted user u is set to "user5," and the noted document r is set to "Doc4." As the operator of the noted document "Doc4" is user3, which does not match user5 which is the noted user u in step S12 of FIG. 10, the processing proceeds to step S14. In step S14, the organization to which the operator user3 of the noted document r "Doc4" belongs; that is, 1T, matches the organization to which the noted user u user5 belongs; that is, 1T. Therefore, the processing proceeds to step S16. In step S16, as the operator user3 of the noted document r "Doc4" is a person in a managerial position (see FIG. 9), the processing proceeds to step S17. In step 17, the operator of the node "Doc3" having an operation type "update" which is first found while tracing back the tree structure from the noted document r "Doc4" is "user2," which is not identical with the user3 which is the operator of the noted document r "Doc4." Accordingly, as a result of determination in step S17, the processing proceeds to step S18. Then, as the organization 1T to which the user5 which is the noted user u belongs is not the top level organization, the processing proceeds to S20 as a result of determination in step S18. In step S20, user2 belonging to the organization 1G (see FIG. 9) that is located at one level higher than the organization 1T to which the user5 belongs in the organization hierarchy (see FIGS. 7 and 8) is set as a new noted user u. Further, as the noted document r "Doc4" is not a root node in the tree structure of the derivation relationships of the documents, the processing proceeds to step S28 as a result of the determination in step S21. In step S28, the management ID "Doc3" of the "update" node which is first found while tracing back the tree structure from the noted document r "Doc4" is set as a new noted document r.

Thereafter, as the operator of the noted document r "Doc3"; that is, user2, does not match the requesting user user5 in step S12, the processing proceeds to step S14 once again. In step S14, the organization to which the operator user2 of the current noted document r "Doc3" belongs; that is, 1G, is identical with the organization to which the current noted user user2 belongs; that is, 1G, and the processing proceeds to step S16. In step S16, the operator "user2" of the noted document r "Doc3" is a person in a managerial position (see FIG. 9), and therefore the processing proceeds to step S17. Here, user2 is not identical with the operator, user1, of the "registration" node "Doc1" which is first found while tracing back the tree structure from the noted document r "Doc3" as a start point. Accordingly, as a result of determination in step S17, the processing proceeds to step S19. In step 18, as the organization 1G to which user2 which is the noted user u belongs is not the top level organization, the processing proceeds to S20. In step S20, user1 belonging to the organization X section (see FIG. 9) that is located at one level higher than the organization 1G in the organization hierarchy (see FIGS. 7 and 8) is set as a new noted user u. Further, as the current noted document r "Doc3" is not a root node in the tree structure of the derivation relationships of the documents (i.e. the determination result is negative (No) in step S21), the processing proceeds to step S28 as a result of the determination in step S21. In step S28, the management ID "Doc1" of the "registration" node which is first found while tracing back the tree structure from the noted document r "Doc3" is set as a new noted document r.

Further, as the operator of the noted document r "Doc1"; that is, user1, does not match the requesting user user5 in step S12, the processing proceeds to step S14. In step S14, the organization to which the operator user1 of the current noted document r "Doc1" belongs; that is, X section, is identical with the organization to which the current noted user user1 belongs; that is, X section, and the processing proceeds to step S16. In step S16, the operator "user1" of the noted document r "Doc1" is a person in a managerial position (see FIG. 9), and therefore the processing proceeds to step S17. Because the noted document r "Doc1" is a root node of the tree structure and a node P having the operation type "update" or "registration" which is found by tracing back the tree structure from the noted document r "Doc1" as a start point does not exist, the determination result is negative (No) in step S17, and the processing proceeds to step S18. In step 18, as the organization X section to which user1 belongs is not the top level organization, No is determined and the processing proceeds to S20. In step S20, a user ID of a user belonging to an organization that is located at one level higher than the organization X section is set as a new noted user u, and the processing proceeds to step S21. In step S21, as the current noted document r "Doc1" is a root node, the processing proceeds to step S22. In this example processing described above, the value of the sequentiality check flag is not changed, since it was set to true in the initialization processing (step S10). Accordingly, as a result of determination in step S22, the processing proceeds to step S24 where access to the requested ID-added document "Doc4" is permitted.

SPECIFIC EXAMPLE 4

An example case where a user having a user ID "user5" requests provision of an ID-added document with a management ID "Doc13" will be described as an example which does not satisfy the Condition 2 described above because the request is an access request to an ID-added document which has not passed an authorized developing route. The ID-added document "Doc13" is a document obtained as a result of updating, by user3, an ID-added document "Doc1" which was updated and registered by user1 belonging to the organization X section located two levels higher than the organization 1T to which user3 himself belongs in the organization hierarchy. In other words, the ID-added document "Doc13" is a document that is generated without having been updated and registered by user2 belonging to the organization 1G located one level higher than the organization 1T to which user3 belongs. As such, because the ID-added document "Doc13" does not satisfy the Condition 2 described above, the access request to the ID-added document "Doc13" is not permitted. Processing to be performed by the access control unit 142 in this case will be described.

In step S10 of FIG. 10, the noted user u is set to user5 and the noted document r is set to "Doc13." Then, in step S12, as the operator of the noted document r "Doc13" is user3, which is not identical with user5 which is the noted user u, the processing proceeds to step S14. In step S14, by reference to the organization information DB 120 (FIG. 9), the organization to which user3 which is the operator of the noted document r "Doc13" belongs; that is, 1T, matches the organization to which the noted user user5 belongs; that is, 1T. Accordingly, the processing proceeds to step S16. In step S16, as the operator user3 of the noted document r "Doc13" is a person in a managerial position, the processing proceeds to step S17. Here, because the operator user3 of the noted document r "Doc13" is not identical with "user1" which is the operator of a "registration" node "Doc1" which is first found while tracing back the tree structure from the noted document r "Doc13" as a start point, the processing proceeds to step S18 as a result of determination in step S17. In step S18, as the organization 1T to which user5 which is the noted user u belongs is not the top level organization, the processing proceeds to step S20. In step S20, user2 belonging to the organization 1G (see FIG. 9) located one level higher than the organization 1T to which user5 belongs in the organization hierarchy (see FIGS. 7 and 8) is set as a new noted user u. Then, as the noted document r "Doc13" is not a root node of the tree structure of the derivation relationships of the documents, the processing proceeds to step S28 as a result of determination in step S21. In step S28, the management ID "Doc1" of a "registration" node which is first found while tracing back the tree structure from the noted document r "Doc13" as a start point is set as a new noted document r.

Thereafter, in step S12, as the operator of the noted document r "Doc1" is user1, which is not identical with the requesting user 5, the processing proceeds to step S14. In step S14, as the organization X section to which user1 which is the operator of the current noted document r "Doc1" belongs does not match the organization 1G to which the current noted user user2 belongs, the processing proceeds to step S30. At this point in time, the value of the sequentiality check flag remains true as set in step S10, the processing proceeds to step S32 as a result of determination in step S30. In step S32, as the current noted document r "Doc1" does not match the management ID "Doc13" of the requested ID-added document, the processing proceeds to step S38 where the value of the sequentiality check flag is set to false. Thereafter, the processing proceeds to step S21. In step S21, as the noted document r "Doc1" is a root node of the tree structure of the derivation relationships, the processing proceeds to step S22. In step S22, as the value of the sequentiality check flag has been set to false, as a result of determination in step S22, the error processing in step S26 is performed, and therefore the access to the ID-added document "Doc13" is not permitted.

SPECIFIC EXAMPLE 5

An example case wherein a user having a user ID "user7" requests provision of an ID-added document with a management ID "Doc10" will be described as another example which does not satisfy the Condition 2 described above because the request is an access request to an ID-added document which has not passed an authorized development route. The ID-added document "Doc10" is a document obtained as a result of an updating operation performed, by user4, with respect to an ID-added document "Doc4" which was updated and registered by user3 belonging to the organization 1T which differs from the organization 2T to which user4 himself belongs and which is located at the same level as the organization 2T (i.e. which is not in a higher or lower level relationship) within the organization hierarchy. Accordingly, while the operator of the ID-added document "Doc10"; that is, user4, is a person in a managerial position, the ID-added document "Doc10" cannot be considered to have passed an authorized development route. Consequently, even if the requesting user user7 belongs to 2T to which user4 also belongs, an access to the ID-added document "Doc10" cannot be permitted. Hereinafter, processing to be performed by the access control unit 142 in this case will be described.

In step S10 of FIG. 10, the noted user u is set to user7 and the noted document r is set to "Doc10." Then, in step S12, as the operator of the noted document r "Doc10" is user4, which is not identical with user7 which is the noted user u, the processing proceeds to step S14. In step S14, by reference to the organization information DB 120 (FIG. 9), the organization to which user4 which is the operator of the noted document r "Doc10" belongs; that is, 2T, matches the organization to which the noted user user7 belongs; that is, 2T. Accordingly, the processing proceeds to step S16. In step S16, as the operator user4 of the noted document r "Doc10" is a person in a managerial position, the processing proceeds to step S17. Here, because the operator user4 of the noted document r "Doc10" is not identical with the user3 which is the operator of an "update" node "Doc4" which is first found while tracing back the tree structure from the noted document r "Doc10" as a start point, the processing proceeds to step S18 as a result of determination in step S17. In step S18, as the organization 2T to which the user7 that is the noted user u belongs is not the top level organization, the processing proceeds to step S20. In step S20, user2 belonging to the organization 1G (see FIG. 9) located one level higher than the organization 2T to which user7 belongs in the organization hierarchy (see FIGS. 7 and 8) is set as a new noted user u.

Then, as the noted document r "Doc10" is not a root node of the tree structure of the derivation relationships of the documents, the processing proceeds to step S28 as a result of determination in step S21. In step S28, the management ID "Doc4" of the "update" node which is first found while tracing back the tree structure from the noted document r "Doc10" as a start point is set as a new noted document r.

Thereafter, in step S12, as the operator of the noted document r "Doc4" is user3, which is not identical with the requesting user7, the processing proceeds to step S14. In step S14, as the organization 1T to which the user3 which is the operator of the current noted document r "Doc4" belongs does not match the organization 1G to which the current noted user u user2 belongs, the processing proceeds to step S30. At this point in time, since the value of the sequentiality check flag remains true as set in step S10, the processing proceeds to step S32 as a result of determination in step S30. In step S32, as the current noted document r "Doc4" does not match the management ID "Doc10" of the requested ID-added document, the processing proceeds to step S38 where the value of the sequentiality check flag is set to false.

Thereafter, as the noted document r "Doc4" is not a root node of the tree structure of the derivation relationships (step S21), and an "update" node "Doc3" which is first found by tracing back the tree structure from "Doc4" is set to a new noted document r (step S28). Then, the processing in step S12 and the subsequent steps will be repeated. In the subsequent processing to be repeated, because the operator of the noted document r "Doc3" and the operator of "Doc1" which is set as a noted document r following "Doc3"; that is, user2 and user1, respectively, are not identical with the requesting user user7, there is no possibility that the determination result in step S12 is affirmative to result in access permission (step S24). Accordingly, after "Doc1" which is a root node of the tree structure of the derivation relationships is set as a noted document r, the processing proceeds and the value of the sequentiality check flag is determined in step S22. At this time, as the value of the sequentiality check flag has been set to false in step S38 as described above, the processing proceeds to step S26 for error processing, as a result of determination in step S22, and the access to the requested ID-added document "Doc10" cannot be permitted.

SPECIFIC EXAMPLE 6

The will be described an example control processing with regard to an access to an ID-added document which is updated and registered by a user belonging to an organization which differs from an organization to which a requesting user belongs and which is located at the same level as the organization to which the requesting user belongs in the organization hierarchy. In this case, as the condition in the former half of the Condition 2 described above (i.e., the condition that the operator of a requested ID-added document belongs to any of the organizations included-in a route which is identified by tracing back the organization hierarchy from the organization to which the requesting user belongs) is not satisfied, access to the requested ID-added document is not permitted. For example, if user7 belonging to the organization 2T requests provision of an ID-added document "Doc4" which is updated and registered by user3 belonging to the organization 1T, access to the requested ID-added document cannot be permitted because the organization 1T to which the operator user3 of the requested ID-added document "Doc4" is not included in organizations (2T, 1G, X, . . . entire company) existing in the route identified by tracing back the organization hierarchy from the organization 2T to which the requesting user user7 belongs serving as a start point. Hereinafter, processing to be performed by the access control unit 142 in this example will be described.

First, in step S10 of FIG. 10, the noted user u is set to user7 and the noted document r is set to "Doc4." Then, in step S12, as the operator of the noted document r "Doc4" is user3, which is not identical with user7 which is the noted user u, the processing proceeds to step S14. In step S14, by reference to the organization information DB 120 (FIG. 9), the organization to which the user3 which is the operator of the noted document r "Doc4" belongs; that is, 1T, does not match the organization to which the noted user user7 belongs; that is, 2T. Accordingly, the processing proceeds to step S30. At this point in time, as the value of the sequentiality check flag remains true as set in step S10, the processing proceeds to step S32 as a result of determination in step S30. In step S32, as the noted document r "Doc4" is the requested ID-added document "Doc4," the processing proceeds to step S34. In step S34, as the organization 2T to which user7 which is the noted user u belongs is not the top level organization (see FIGS. 7 and 8), the processing proceeds to step S36, where user2 belonging to the organization 1G (see FIG. 9) located one level higher than the organization 2T to which user7 belongs is set as a new noted user u.

After step S36, the processing returns to step S14, in which the organization 1T to which the user3 which is the operator of the noted document r "Doc4" belongs does not match the organization 1G to which the noted user u, user2, belongs. Accordingly, the processing proceeds to step S30. In step S30, as the value of the sequentiality check flag is true, the processing proceeds to step S32. In step S32, as the noted document r "Doc4" is the requested ID-added document "Doc4," the processing proceeds to step S34. In step S34, as the organization 1G to which user2 which is the noted user u belongs is not the top level organization (see FIGS. 7 and 8), the processing proceeds to step S36, where user1 belonging to the organization X section located one level higher than the organization 1G to which noted user u "user2" belongs is set as a new noted user u. Thereafter, the processing in step S14 and the subsequent steps will be further repeated. In this repetitive processing, because there is no possibility the organization 1T to which user that is the operator of the noted document r "Doc4" belongs matches an organization included in a route which is identified by tracing back the organization hierarchy from the organization X section to which the noted user u user1 belongs, the determination result in step S14 will not be affirmative (Yes). As such, by repetition of the processing loop including steps S14 and S30 to S36, the organization hierarchy is traced back for detecting the organization to which the noted user u belongs, and when determination in step S34 is performed after a user belonging to the top level organization in the organization hierarchy is set as the noted user u, the processing proceeds to step S38 where the value of the sequentiality check flag is set to false. In the meantime, the noted document r remains set to the requested ID-added document "Doc4."

After step S38, the processing proceeds to step S21. Then, as the noted document r "Doc4" is not a root node, the processing proceeds to step S28, and the processing in step S12 and the subsequent steps will be repeated. When the determination in step S21 is performed after "Doc1" which is a root node of the tree structure of the derivation relationships is set to the noted document r, the determination of the value of the sequentiality check flag is performed in step S22. As the value of the sequentiality check flag is set to false as described above, the processing proceeds to step S26 for error processing as a result of determination in step S22, and the access to the ID-added document "Doc4" by user7 is not permitted.

SPECIFIC EXAMPLE 7

There will be described access control processing with regard to an access request to an ID-added document which is updated and registered by another user belonging to the organization to which a requesting user belongs. In consideration of the Conditions 1 and 2 described above, access to a document which is updated and registered by a user that is not a person in a managerial position is not permitted unless the document is derived from a document which is updated and requested by the requesting user. Here, there will be described an example case in which user 6 belonging to the organization 1T requests provision of the ID-added document "Doc7" which is updated and registered by user5 belonging to the same organization 1T.

In step S10 of FIG. 10, the noted user u is set to user6 and the noted document r is set to "Doc7." Then, in step S12, as the operator of the noted document r "Doc7" is user5, which is not identical with user6 which is the noted user u, the processing proceeds to step S14. In step S14, by reference to the organization information DB 120 (FIG. 9), the organization to which user5 which is the operator of the noted document r "Doc7" belongs; that is, 1T, matches the organization to which the noted user u "user6" belongs; that is, also 1T. Accordingly, the processing proceeds to step S16. In step S16, as the operator user5 of the noted document r "Doc7" is not a person in a managerial position, the processing proceeds to step S40 in FIG. 11. In the processing procedure illustrated in FIG. 11, as a node in which the operator is user6 which is the requesting user is not included in the "update" operation nodes ("Doc7," "Doc4," "Doc3," and "Doc1") existing in the route identified by tracing back the tree structure of the derivation relationships shown in FIG. 6 from the noted document r "Doc7" as a start point to the root node, the error processing in step S48 is performed, and the access to the requesting document is not permitted.

SPECIFIC EXAMPLE 8

A last specific example of access control concerning an ID-added document which is updated and registered by a user belonging to multiple organizations will be described. The ID-added document "Doc12," for example, is a document obtained as a result of an updating operation, performed by user8 that performs business in both the organizations 1T and 2T, with respect to the ID-added document "Doc5" which is updated and registered by user4 who is a person in a managerial position in the organization 2T. In other words, the ID-added document "Doc12" is a document obtained as a result of updating and registering operations performed by user8 as a business in one of the organizations to which user8 belongs; that is, 2T. There will be described processing to be performed by the access control unit 142 in a case in which user3 who is a person in a managerial position in the organization 1T which is the other one of the organizations to which user8 belongs issues an access request to this ID-added document "Doc12."

In step S10 of FIG. 10, the noted user u is set to user3 and the noted document r is set to "Doc12." Then, in step S12, as the operator of the noted document r "Doc12" is user8, which is not identical with user3 which is the requesting user, the processing proceeds to step S14. Further, because one of the organizations 1T and 2T to which the user8 which is the operator of the noted document r "Doc12" belongs matches the organization 1T to which the noted user u user3 belongs (i.e. an affirmative determination result in step S14), and because the operator user8 of the noted document r "Doc12" is not a person in a managerial position (see FIG. 9), the processing proceeds to step S40 in FIG. 11. Here, in the processing procedure illustrated in FIG. 11, as the requested ID-added document "Doc12" is not a document derived from an ID-added document which is updated and registered by user3 which is a requesting user by reference to the derivation relationships shown in FIG. 6, the error processing in step S48 is performed, and the access to the requesting ID-added document "Doc12" by user3 is not permitted.

Further, if user8 is a person in a managerial position in the organization 2T, for example, the processing illustrated in FIG. 11 is not performed and the determination result is affirmative (Yes) in step S16 and the processing in step S17 and the subsequent steps is performed. However, the organization 2T to which user8 which is the operator of the requested ID-added document "Doc12" belongs is not included in the organizations (1T, 1G, X section, . . . entire company) existing in a route identified by tracing back the organization hierarchy from the organization 1T to which the requesting user user3 belongs as a start point. Consequently, as in the case in Specific Example 6 described above, the processing loop including steps S30 to S36 is repeated and, as a result, the value of the sequentiality check flag is set to false. Accordingly, access is not permitted.

As such, while user3 corresponds to a boss of user8 in the organization 1T, user3 is not authorized to access a document which is updated and registered by user8 in regards to the business in the organization 2T, which differs from the organization 1T.

In the processing examples described above with reference to FIGS. 10 and 11 and Specific Examples 1 to 8, only documents having a value of the operation type "registration" or "update" can be a noted document r in the derivation relationships of the documents. Accordingly, the client terminal 20 may be configured to generate a new ID-added document and register the ID-added document in the document management server 10 only when an operation of initially registering a new ID-added document (i.e. initial registration) or an "update" operation (i.e. an operation which causes a change in the document content of an ID-added document) is performed, and not to perform generation of a new ID-added document and registration of the ID-added document in the document management server 10 when an operation other than the "update" operation, such as a "viewing" operation or an "acquisition" operation, (i.e. an operation which does not cause a change in the document content of an ID-added document) is performed. In this case, only the records in which the value of the operation type is "registration" or "update" are to be registered in the derivation relationship DB 110. When the client terminal 20 performs generation and registration of an ID-added document with regard to only a "registration" operation or an "update" operation in a case where the operations are performed with respect to a document in a time sequence represented in the table shown in FIG. 5, for example, the data content of the records shown in FIG. 5 excluding the record with the management ID "Doc2" (the operation type: "viewing"), the records with the management IDs "Doc6" and "Doc8" (the operation type: "acquisition") is registered in the derivation relationship DB 110. In this case, in the records with the management IDs "Doc3," "Doc7," and "Doc9" having the operation type "update" and having, as values of the parent IDs, the management IDs "Doc2," "Doc6," and "Doc8," respectively, values of the management IDs of ID-added documents containing the document content obtained prior to the change of the document content by the respective "update" operations are registered as values of the parent ID. Specifically, the parent ID of the record having the management ID "Doc3" is "Doc1," and the parent ID of the records having the management IDs "Doc7" and "Doc9" is "Doc4."

When generation of an ID-added document and registration of the ID-added document in the document management server 10 is performed with regard to only the "registration" operation or the "update" operation, the access control unit 142, when acquiring a management ID P(r) of an "update" or "registration" node which is first found while tracing back the tree structure of the derivation relationships from the noted document r (in steps S17 and S28 in FIG. 19 and step S42 in FIG. 11), can simply acquire the parent ID registered in the record of the noted document r in the derivation relationship DB 110 as P(r).

Further, in the example processing described above, in step S21 of FIG. 10 or step S40 in FIG. 11, whether or not the noted document r corresponds to a root node of a tree structure is determined. In another processing example, it is also possible to previously set a certain node as a terminal point for use in determination that the tree structure is no longer traced back upon reach of this terminal node, and determine, in step S21 of FIG. 10 or step S40 in FIG. 11, whether or not the noted document r is a node which is set as the terminal point when tracing back the tree structure as described above. In this case, information indicating the terminal point can simply be registered in a record corresponding to the management ID of the node which is set as a terminal point in the derivation relationship DB 110.

Also, in the example processing described above, in step S34 of FIG. 10, a determination is made as to whether or not the organization to which the noted user u belongs is located at the top level in the organization hierarchy. In another processing example, it is also possible to previously set a certain organization as a terminal point for use in determination that the organization hierarchy is no longer traced back upon reach of this organization, and determine, in step S34 of FIG. 10, whether or not the organization to which the noted user u belongs is the organization which is set as the terminal point for tracing back the organization hierarchy as described above. In this example case, in the processing loop including steps S30, S32, S34, and S36, there is to be performed determination as to whether or not the operator of the requested ID-added document belongs to any of the organizations included in a route identified by tracing back the organization hierarchy to the organization which is set as a terminal point from the organization to which the requesting user belongs.

In addition, in another processing example, a "disclosure" attribute representing whether or not an ID-added document 300 is a subject of disclosure (sharing) can be included in the log information 316 of the ID-added document. For example, a "disclosure" attribute value is registered in a record corresponding to each management ID of the derivation relationship DB 110 of the document management server 10, in such a manner that "1" is registered as a "disclosure" attribute value of an ID-added document which is a subject of disclosure and "0" is registered as a "disclosure" attribute value of an ID-added document which is not a subject of disclosure. In this regard, the system may be configured such that a user can designate this "disclosure" attribute value when performing an operation with respect to an ID-added document with the client terminal 20. When the "disclosure" attribute value is used, the access control unit 142 first acquires this "disclosure" attribute value included in the record corresponding to the requested document in the derivation relationship DB 110 before starting the processing procedure shown in FIG. 10, for example. Then, if the "disclosure" attribute value that is acquired is "1," the access control unit 142 starts the processing shown in FIG. 10 to determine whether or not the access is permitted, whereas if the "disclosure" attribute value that is acquired is "0," the access control unit 142 does not authorize users other than privileged users such as an operator that performed an operation for generating the requested document and a managing person to access to the requested document.

Also, in a group such as a company, members and persons having a managerial position in each organization may be changed by personnel changes and the like, or the structure of the organization hierarchy may be changed by an organizational change in a company. In order to conform to such a change in the organizations, it is possible to previously register in the organization information DB 120 information concerning a change caused in the organization. For example, when there is a change in members of each organization, for example, information concerning the members before and after the change (e.g. the data content shown in FIG. 9) and the time of the change is registered in the organization information DB 120. Further, when the structure of the organization hierarchy is changed, information representing the structure of the organization hierarchy before and after the change (e.g., the data content shown in FIG. 8), information of the members of each organization in each of the organization structures before and after the change, and the time of the change is registered in the organization information DB 120. Then, the access control unit 142 can acquire the operation time and date of the subject ID-added document from the derivation relationship DB 110 and use the information of the organization structure and the members before the change if the operation time and date that is acquired is before the time of the change registered in the organization information DB 120 and use the information of the organization structure and the members after the change if the operation time and date that is acquired is after the time of the change of the organization information. If the organization hierarchy or the members are changed multiple times, information in which the information concerning the organization hierarchy or the members is associated with the time period in which the information is valid can be registered in the organization information DB 120, so that the access control unit 142 can acquire from the organization information DB 120 and use the information concerning the organization hierarchy or the members corresponding to the time period including the operation time and date of the subject ID-added document.

Although in the examples described above the management ID is issued by each client terminal 20, the document management server 10 may instead issue the management ID. In this case, the client terminal 20, when performing an operation with respect to an ID-added document, generates document data which include the management ID in the ID-added document prior to the operation as the parent ID 314, the log information 316 concerning the operation, and the document content 320 acquired as a result of the operation, with no management ID 312, and sends the document data to the document management server 10. The document management server 10 then assigns a new management ID to the document data that is received and registers the management ID and the information included in the document data in the document DB 100 and the derivation relationship DB 110. The document management server 10 further sets the assigned management ID in the document data to generate an ID-added document, and returns this ID-added document to the client terminal 20. The client terminal 20 then replaces the ID-added document prior to the operation with the ID-added document that is received. As such, each processing example described above can be similarly executed in a structure in which the management ID is assigned by the document management server 10.

Further, although in the examples described above the ID-added document 300 including the management ID 312, the parent ID 314, the log information 316, and the document content 320 is stored in the client terminal 20, it may be the case that only the management ID 312 is stored in the client terminal 20 and other information is stored in the document management server 10. In this case, the client terminal 20, when performing an operation with regard to a document, sends the management ID corresponding to the document to the document management server 10, which then provides the corresponding document to the client terminal 20. Further, as another example, an ID-added document 300 stored in the client terminal 20 may include the management ID 312 and the document content 320 and does not include the parent ID 314 and the log information 316. In this case, the document management server 10 may store the parent ID 314 and the log information 316 in association with the management ID 312.

Here, when the document management server 10 assigns a management ID, the document management server 10 generates a management ID corresponding to the acquisition operation and provides the client terminal 20 with the management ID in association with the document. The document management server 10 also records, in the derivation relationship DB 110, the log information (the operation time and date, the operator, and so on) concerning the acquisition operation, the earlier management ID (i.e., the parent ID), and the assigned management ID. The client terminal 20 replaces the management ID sent to the document management server 10 with the management ID that is received, and opens the received document. The user then performs an operation such as viewing and editing with respect to the opened document. Upon completion of the operation with respect to the document, the client terminal 20 sends the document acquired by the operation, along with the management ID and the log information concerning the operation, to the document management server 10. The document management server 10 assigns a new management ID to the document that is received and registers the document with the new management ID in the derivation relationship DB 110, and further registers the management ID that is received from the client terminal 20 in the derivation relationship DB 110 as the parent ID. In addition, the document management server 10 registers the log information and the document after the operation that is received in the derivation relationship DB 110 and the document DB 100, respectively. The document management server 10 then returns the management ID newly assigned to the client terminal 20. The client terminal 20 replaces the earlier management ID with the received management ID. With the above processing, the derivation relationships among the operations are to be accumulated in the document management server 10.

On the other hand, in the structure in which the management ID is assigned by the client terminal 20, the document management server 10 can simply return to the client a document corresponding to the management ID received from the client terminal 20. The client terminal 20 opens the document that is received, so that the user can perform operations on the document. After completion of the operation, the client terminal 20 assigns a new management ID to the document acquired as a result of the operation and sends to the document management server 10 the ID-added document described above including this new management ID and the corresponding information. Then, the client terminal 20 stores only the management ID in the ID-added document and deletes other information.

The document management server 10 in the illustrated system described above is typically implemented by a general-purpose computer executing a program that describes the function or processing contents of each unit of the document management server described above. As shown in FIG. 19, the computer includes, as hardware, a circuit structure in which a CPU (central processing unit) 40, a memory (primary memory) 42, various I/O (input/output) interfaces 44, and other elements are interconnected via a bus 46, for example. Further, a hard disk drive 48 and a disk drive 50 for reading a portable non-volatile recording medium of various standards such as CDs and DVDs and flash memories are connected, via the I/O interfaces 44, for example, to the bus 46. Such a drive 48 or 50 functions as an external storage device for the memory. The program that describes the processing contents of the exemplary embodiment is stored in a fixed storage device such as the hard disk drive 48 via a recording medium such as a CD or DVD or via the network, and then installed in the computer. When the program stored in the fixed storage device is read into the memory and performed by the CPU, the processing of the exemplary embodiment is implemented. Similarly, the client terminal 20 can be implemented by causing a general-purpose computer to perform a program that describes the document processing program described above.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. An information processing apparatus, comprising:
a document information storage unit that stores a derivation relationship in which a first document is a parent and a second document generated as a result of an operation performed with respect to the first document is a child, the document information storage unit storing information representing an operator that performed the operation with respect to the first document in association with the second document;
an organization information storage unit that stores information representing a structure of an organization hierarchy formed of a plurality of organizations representing members belonging to each of the organizations; and
a document output permission/prohibition determination unit that, upon receiving a document output request in which a requested document and a requesting person are specified, determines whether or not to permit output of the requested information representing an operator associated with the requested document or information representing an operator associated with a document corresponding to an ancestor of the requested document in a tree structure of the derivation relationships stored in the document information storage unit against information representing members belonging to an organization that includes the requesting person as a member or an organization that is located at a higher level than the organization including the requesting person in the organization hierarchy, in the information stored in the organization information storage unit.

2. The information processing apparatus according to claim 1, wherein
the document output permission/prohibition determination unit determines whether or not the organization including the requesting person as a member or the organization that is located at a higher level than the organization including the requesting person in the organization hierarchy includes the operator associated with the requested document as a member and, on the basis of a result of the determination, determines whether or not to permit output of the requested document.

3. The information processing apparatus according to claim 2, wherein
the document output permission/prohibition determination unit does not permit output of the requested document when the requested document is a document which is updated and registered without having passed a development route from a higher level organization to a lower level organization in the organization hierarchy.

4. The information processing apparatus according to claim 3, wherein
the document output permission/prohibition determination unit permits output of the requested document when an operator associated with at least one of the documents included in a route identified by tracing back the tree structure from the requested document as a start point is the requesting user.

5. The information processing apparatus according to claim 4, wherein
the organization information storage unit further stores information representing a person in a managerial position among the members belonging to each of the organizations, and
the document output permission/prohibition determination unit does not permit output of the requested document when the operator associated with the requested document is not a person in a managerial position in the organization including the operator as a member, and an operator associated with any of documents included in a route identified by tracing back the tree structure from the requested documents as a start point is not the requesting user.

6. The information processing apparatus according to claim 3, wherein
the organization information storage unit further stores information representing a person in a managerial position among the members belonging to each of the organizations, and
the document output permission/prohibition determination unit does not permit output of the requested document when the operator associated with the requested document is not a person in a managerial position in the organization including the operator as a member, and an operator associated with any of documents included in a route identified by tracing back the tree structure from the requested documents as a start point is not the requesting user.

7. The information processing apparatus according to claim 2, wherein
the document output permission/prohibition determination unit permits output of the requested document when an operator associated with at least one of the documents included in a route identified by tracing back the tree structure from the requested document as a start point is the requesting user.

8. The information processing apparatus according to claim 7, wherein
the organization information storage unit further stores information representing a person in a managerial position among the members belonging to each of the organizations, and
the document output permission/prohibition determination unit does not permit output of the requested document when the operator associated with the requested document is not a person in a managerial position in the organization including the operator as a member, and an operator associated with any of documents included in a route identified by tracing back the tree structure from the requested documents as a start point is not the requesting user.

9. The information processing apparatus according to claim 2, wherein
the organization information storage unit further stores information representing a person in a managerial position among the members belonging to each of the organizations, and
the document output permission/prohibition determination unit does not permit output of the requested document when the operator associated with the requested document is not a person in a managerial position in the organization including the operator as a member, and an operator associated with any of documents included in a route identified by tracing back the tree structure from the requested documents as a start point is not the requesting user.

10. The information processing apparatus according to claim 1, wherein
the document output permission/prohibition determination unit permits output of the requested document when an operator associated with at least one of the documents included in a route identified by tracing back the tree structure from the requested document as a start point is the requesting user.

11. The information processing apparatus according to claim 10, wherein
  the organization information storage unit further stores information representing a person in a managerial position among the members belonging to each of the organizations, and
  the document output permission/prohibition determination unit does not permit output of the requested document when the operator associated with the requested document is not a person in a managerial position in the organization including the operator as a member, and an operator associated with any of documents included in a route identified by tracing back the tree structure from the requested documents as a start point is not the requesting user.

12. The information processing apparatus according to claim 1, wherein
  the organization information storage unit further stores information representing a person in a managerial position among the members belonging to each of the organizations, and
  the document output permission/prohibition determination unit does not permit output of the requested document when the operator associated with the requested document is not a person in a managerial position in the organization including the operator as a member, and an operator associated with any of documents included in a route identified by tracing back the tree structure from the requested documents as a start point is not the requesting user.

13. A computer-readable storage medium storing a program causing a computer to execute a process for managing electronic documents, the process comprising:
  storing, in a document information storing unit, a derivation relationship in which a first document is a parent and a second document generated as a result of an operation performed with respect to the first document is a child, and information representing an operator that performed the operation with respect to the first document in association with the second document;
  storing information representing a structure of an organization hierarchy formed of a plurality of organizations and information representing members belonging to each of the organizations in an organization information storage unit; and
  determining, upon receiving a document output request in which a requested document and a requesting person are specified, whether or not to permit out put of the requested document to the requesting person, by checking information representing an operator associated with the requested document or information representing an operator associated with a document corresponding to an ancestor of the requested document in a tree structure of the derivation relationships stored in the document information storage unit against information representing members belonging to an organization that includes the requesting person as a member or an organization that is located at a higher level than the organization including the requesting person in the organization hierarchy, in the information stored in the organization information storage unit.

14. An information processing method, comprising:
  storing, in a document information storing unit, a derivation relationship in which a first document is a parent and a second document generated as a result of an operation performed with respect to the first document is a child, and information representing an operator that performed the operation with respect to the first document in association with the second document;
  storing information representing a structure of an organization hierarchy formed of a plurality of organizations and information representing members belonging to each of the organizations in an organization information storage unit; and
  determining, upon receiving a document output request in which a requested document and a requesting person are specified, whether or not to permit out put of the requested document to the requesting person, by checking information representing an operator associated with the requested document or information representing an operator associated with a document corresponding to an ancestor of the requested document in a tree structure of the derivation relationships stored in the document information storage unit against information representing members belonging to an organization that includes the requesting person as a member or an organization that is located at a higher level than the organization including the requesting person in the organization hierarchy, in the information stored in the organization information storage unit.

15. An information processing system comprising a first information processing apparatus and a second information processing apparatus,
  the first information processing apparatus including a document output requesting unit that issues a document output request in which a requested document and requesting person are specified to the second information processing apparatus; and
  the second information processing apparatus including:
  a document information storage unit that stores a derivation relationship in which a first document is a parent and a second document generated as a result of an operation performed with respect to the first document is a child, the document information storage unit storing information representing an operator that performed the operation with respect to the first document in association with the second document;
  an organization information storage unit that stores information representing a structure of an organization hierarchy formed of a plurality of organizations and information representing members belonging to each of the organizations; and
  a document output permission/prohibition determination unit that, upon receiving the document output request from the first information processing apparatus, determines whether or not to permit output of the requested document to the requesting person, by checking information representing an operator associated with the requested document or information representing an operator associated with a document corresponding to an ancestor of the requested document in a tree structure of the derivation relationships stored in the document information storage unit against information representing members belonging to an organization that includes the requesting person as a member or an organization that is located at a higher level than the organization including the requesting person in the organization hierarchy, in the information stores in the organization information storage unit.

* * * * *